United States Patent
Fanty et al.

(10) Patent No.: US 9,792,825 B1
(45) Date of Patent: Oct. 17, 2017

(54) TRIGGERING A SESSION WITH A VIRTUAL COMPANION

(71) Applicant: The Affinity Project, Inc., Cambridge, MA (US)

(72) Inventors: Mark Alan Fanty, Norfolk, MA (US); Ronald Steven Suskind, Cambridge, MA (US); Stuart R. Patterson, Hingham, MA (US); John Nguyen, Lexington, MA (US); Stephen R. Springer, Needham, MA (US)

(73) Assignee: The Affinity Project, Inc., Cambridge, MA (US)

( * ) Notice: Subject to any disclaimer, the term of this patent is extended or adjusted under 35 U.S.C. 154(b) by 0 days.

(21) Appl. No.: 15/229,074

(22) Filed: Aug. 4, 2016

Related U.S. Application Data

(63) Continuation-in-part of application No. 15/166,507, filed on May 27, 2016.

(51) Int. Cl.
  *G09B 21/00* (2006.01)
  *G09B 5/12* (2006.01)
  (Continued)

(52) U.S. Cl.
  CPC .............. *G09B 5/125* (2013.01); *A63F 13/25* (2014.09); *A63F 13/57* (2014.09); *A63F 13/67* (2014.09); *G06K 9/00744* (2013.01); *G10L 13/08* (2013.01); *G10L 15/02* (2013.01); *G10L 15/1815* (2013.01); *G10L 15/22* (2013.01); *G10L 25/63* (2013.01)

(58) Field of Classification Search
  CPC ........... A63F 13/57; A63F 13/25; A63F 13/67
  See application file for complete search history.

(56) References Cited

U.S. PATENT DOCUMENTS

| | | | |
|---|---|---|---|
| 6,230,111 | B1 | 5/2001 | Mizokawa |
| 6,731,307 | B1 | 5/2004 | Strubbe et al. |

(Continued)

FOREIGN PATENT DOCUMENTS

| | | |
|---|---|---|
| CN | 104483847 | 4/2015 |
| JP | 2012-93972 | 5/2012 |

(Continued)

OTHER PUBLICATIONS

U.S. Appl. No. 61/916,701, filed Dec. 16, 2013, Hu et al.

(Continued)

*Primary Examiner* — Michael Grant
(74) *Attorney, Agent, or Firm* — Fish & Richardson P.C.

(57) ABSTRACT

A user of a device may interact with a character presented by the device. A session between the user and the character may be started by a user, may be triggered by an event, or may be started in other ways. The user of the of the device may be associated with one or more trigger events. Information about the trigger events may be obtained and processed to determine when a trigger event has occurred. When a trigger event has occurred, a session may be started on the device with the character. A segment may be selected to be presented during the session, and an interaction corresponding to the segment may be presented by the character to the user. For example, the character may speak a phrase using a text-to-speech voice.

20 Claims, 13 Drawing Sheets

| Script ID: | game-who-said |
|---|---|
| Data Item Type: | game-who-said |
| Sequence: | 10 present "Let's play a game."<br>20 present "Listen to this!"<br>30 present $clip<br>40 present "Who said that?"<br>50 present $choices<br>60 receive $choice<br>70 if $choice == $character.name present "Right!"<br>80 if $choice != $character.name present "Nope, that was $character.name." |

(51) Int. Cl.
G06K 9/00 (2006.01)
G10L 25/63 (2013.01)
G10L 15/02 (2006.01)
G10L 13/08 (2013.01)
G10L 15/22 (2006.01)
G10L 15/18 (2013.01)
A63F 13/57 (2014.01)
A63F 13/25 (2014.01)
A63F 13/67 (2014.01)

(56) References Cited

U.S. PATENT DOCUMENTS

| | | | |
|---|---|---|---|
| 6,795,808 | B1 | 9/2004 | Strubbe et al. |
| 2004/0147814 | A1 | 7/2004 | Zancho et al. |
| 2008/0077277 | A1 | 3/2008 | Park et al. |
| 2009/0055019 | A1 | 2/2009 | Stiehl et al. |
| 2009/0319459 | A1 | 12/2009 | Breazeal et al. |
| 2010/0167623 | A1* | 7/2010 | Eyzaguirre .............. A63H 3/28 446/330 |
| 2012/0295510 | A1 | 11/2012 | Boeckle |
| 2013/0090949 | A1 | 4/2013 | Tibebu |
| 2014/0018382 | A1 | 1/2014 | DeLack |
| 2014/0156645 | A1 | 6/2014 | Brust et al. |
| 2014/0212854 | A1 | 7/2014 | Divakaran et al. |
| 2014/0347265 | A1 | 11/2014 | Aimone et al. |
| 2015/0170531 | A1 | 6/2015 | Hu et al. |
| 2015/0294595 | A1* | 10/2015 | Hu ...................... G06Q 10/101 434/127 |
| 2015/0336276 | A1 | 11/2015 | Song et al. |
| 2016/0005326 | A1 | 1/2016 | Syrmis et al. |
| 2016/0217496 | A1* | 7/2016 | Tuchman ........... G06Q 30/0269 |

FOREIGN PATENT DOCUMENTS

| | | |
|---|---|---|
| JP | 5539842 | 7/2014 |
| WO | WO 2013/166146 | 11/2013 |

OTHER PUBLICATIONS

U.S. Appl. No. 15/229,070, filed Aug. 4, 2016.
Acapela Group, "Voice synthesis—Text to Speech | voice solutions" [online], [retrieved on Dec. 2, 2014]. Retrieved from the Internet: http://www.acapela-group.com/, 4 pages.
AITalk® Customer Voice, "Original Voice Dictionary Creating Service" [online], [retrieved on Dec. 2, 2014]. Retrieved from the Internet: http://www.ai-j.jp/english/product/customvoice.html, 2 pages.
Bemelmans et al., "The Potential of Socially Assistive Robotics in Care of Elderly, a Systematic Review," 2011, Third International Conference HRPR 2010, pp. 83-89.
Bohus et al., "Sorry, I Didn't Catch That!—An Investigation of Non-understanding Errors and Recovery Strategies" [online], [retrieved on Dec. 2, 2014]. Retrieved from the Internet: http://www.cs.cmu.edu/~dbohus/docs/nonu_final.pdf, 16 pages.
CereProc, "Voice Creations FAQs" [online], [retrieved on Dec. 2, 2014]. Retrieved from the Internet: https://www.cereproc.com/en/support/faqs/voicecreation, 3 pages.
Cleverscript, "Create a clever script" (conversational AI engine by Existor Ltd © 2012-2014) [online], [retrieved on Dec. 2, 2014]. Retrieved from the Internet: www.cleverscript.com, 2 pages.
Cleverscript, "Manual and Tutorial" [online], [retrieved on Dec. 2, 2014]. Retrieved from the Internet: http://www.cleverscript.com/CSL/CleverScriptManual.pdf, 76 pages.
Existor, "Evie—Electronic Virtual Interactive Entity—Artificial Intelligence is communication". [online], [retrieved on Dec. 2, 2014]. Retrieved from the Internet: http://www.existor.com, 1 page.
Ezzat et al., "Trainable Videorealistic Speech Animation" Massachusetts Institute of Technology. [online], [retrieved on Dec. 2, 2014]. Retrieved from the Internet: http://cbcl.mit.edu/cbcl/publications/ps/siggraph02.pdf, 11 pages.
Festvox, "Transform" [online], [retrieved on Dec. 2, 2014]. Retrieved from the Internet: http://www.festvox.org/transform/, 2 pages.
iSpeech, "Powerful Speech Platform" [online], [retrieved on Dec. 2, 2014]. Retrieved from the Internet: http://www.ispeech.org, 7 pages.
Hamilton, "Eugene Goostman versus Siri" (Jun. 10, 2014) [online], [retrieved on Mar. 16, 2016]. Retrieved from the Internet: http://www.lauradhamilton.com/eugene-goostman-versus-siri, 3 pages.
Levy, "Siri's Inventors are Building a Radical New AI that Does Anything You Ask" (Aug. 12, 2014) [online], [retrieved on Mar. 16, 2016]. Retrieved from the Internet: http://www.wired.com/2014/08/viv/, 2 pages.
Leuski et al., "NPCEditor: A Tool for Building Question-Answering Characters" [online], [retrieved on Dec. 2, 2014]. Retrieved from the Internet: http://people.ict.usc.edu/~leuski/publications/papers/npceditor.pdf, 8 pages.
Massachusetts Institute of Technology, "Scientists collaborate internationally to identify the neural mechanisms and possible benefits of 'Affinity Therapy' in children with autism" (Apr. 24, 2014) [online], [retrieved on Dec. 2, 2014]. Retrieved from the Internet: https://iacc.hhs.gov/non-iacc-events/2014/nimh_lecture_ron_suskind_042414.pdf, 1 page.
Pappu et al., "Predicting Tasks in Goal-Oriented Spoken Dialog Systems using Semantic Knowledge Bases" *Proceedings of the SIGDIAL 2013 Conference*, pp. 242-250 (Aug. 22-24, 2013) [online], [retrieved on Dec. 2, 2014]. Retrieved from the Internet: https://aclweb.org/anthology/W/W13/W13-4038.podf, 9 pages.
Screaming Bee Inc., "MorphVOX Pro Voice Change" [online], [retrieved on Dec. 2, 2014]. Retrieved from the Internet: http://www.screamingbee.com/, 1 page.
SitePal, "Text-to-Speech" [online], [retrieved on Dec. 2, 2014]. Retrieved from the Internet: http://www.sitepal.com/ttswidgetdemo/, 1 page.
Strannegard et al., "A General System for Learning and Reasoning in Symbolic Domains" [online], [retrieved on Dec. 2, 2014]. Retrieved from the Internet: http://agi-conf.org/2014/wp-content/uploads/2014/08/strannegard-general-agi14.pdf, 12 pages.
Suskind, "Life, Animated: A Story of Sidekicks, Heroes, and Autism," Apr. 2014, 358 pages.
The New York Times, "Inside the Mind of a Child with Autism," written by Benedict Carey on Apr. 7, 2014 [online], [retrieved on Dec. 2, 2014]. Retrieved from the Internet: http://well.blogs.nytimes.com/2014/04/07/inside-the-mind-of-a-child-with-autism/?_r=0, 3 pages.
Wired.Co.Uk, "IBM reveals 'brain-like' chip with 4,096 cores," written by Daniela Hernandez on Aug. 8, 2014 [online], [retrieved on Dec. 2, 2014]. Retrieved from the Internet: http://www.wired.co.uk/news/archive/2014-08/08/ibm-brain-like-chip, 8 pages.
Yale Daily News, "Suskind sparks autism research," written by Eddy Wang on Apr. 15, 2014 [online], [retrieved on Dec. 2, 2014]. Retrieved from the Internet: http://yaledailynews.com/blog/2014/04/15/suskind-sparks-autism-research/, 2 pages.
International Search Report and Written Opinion for App. Ser. No. PCT/US15/62416, dated Feb. 5, 2016, 11 pages.
U.S. Appl. No. 15/166,507, filed May 27, 2016.
U.S. Appl. No. 15/166,333, filed May 27, 2016.

* cited by examiner

Segment List

| Number | Script ID | Data Item ID |
|---|---|---|
| 1 | hello | |
| 2 | play-clip-fun | toy-story-clip-64 |
| 3 | game-who-said | toy-story-who-said-23 |
| 4 | joke | joke-287 |
| 5 | emotion-lesson | beauty-beast-clip-17 |
| 6 | goodbye | |

Fig. 4

Hero Profile

| Hero ID: | 30403 |
|---|---|
| Name: | Dan |
| Age: | 12 |
| Gender: | M |
| Personality Type: | INTJ |
| Diagnosis: | Autistic Disorder |
| Vocabulary: | 5 |
| Communication Skills: | 3 |
| Affinities: | [Harry Potter; Lion King] |
| Goals: | [Being comfortable in a new place; Bonding; Social and emotional skills] |

Fig. 5A

Global Phrase List

| Variable: | Phrases |
|---|---|
| greeting1 | "Good morning!"<br>"Hey $name"<br>"Good afternoon."<br>"Hello." |
| greeting2 | "Good to see you again."<br>"How are you doing today?" |
| goodbye1 | "Fun hanging out with you."<br>"Enjoy the rest of your day" |
| goodbye2 | "Goodbye"<br>"Later"<br>"Hasta manana" |
| laugh | "That was funny!"<br>"Love that one!"<br>"Ha ha ha!" |

Fig. 5B

Character List

| ID: | Movie ID | Name | Gender | Number | Age |
|---|---|---|---|---|---|
| 1765 | toy-story | Aliens | Neutral | Plural | Other |
| 1766 | toy-story | Andy | Male | Singular | Child |
| 1767 | toy-story | Andy's Mom | Female | Singular | Adult |
| 1768 | toy-story | Woody | Male | Singular | Other |
| 1769 | toy-story | Buzz Lightyear | Male | Singular | Other |

Fig. 5C

| Script ID: | hello |
|---|---|
| Data Item Type: | None |
| Sequence: | 10 present $greeting1<br>20 present $greeting2 |

Fig. 6A

| Script ID: | goodbye |
|---|---|
| Data Item Type: | None |
| Sequence: | 10 present $goodbye1<br>20 present $goodbye2 |

Fig. 6B

| Script ID: | play-clip-fun |
|---|---|
| Data Item Type: | movie-clip, TV-clip |
| Sequence: | 10 present $intro1<br>20 present $intro2<br>30 present $clip<br>40 present $recap1<br>50 present $recap2 |

Fig. 6C

| Script ID: | game-who-said |
|---|---|
| Data Item Type: | game-who-said |
| Sequence: | 10 present "Let's play a game."<br>20 present "Listen to this!"<br>30 present $clip<br>40 present "Who said that?"<br>50 present $choices<br>60 receive $choice<br>70 if $choice == $character.name present "Right!"<br>80 if $choice != $character.name present "Nope, that was $character.name." |

Fig. 6D

| Script ID: | joke |
|---|---|
| Data Item Type: | joke |
| Sequence: | 10 present "Time for a joke."<br>20 present $setup<br>30 present $punchline<br>40 present $laugh |

Fig. 6E

| Script ID: | emotion-lesson |
|---|---|
| Data Item Type: | emotion-lesson |
| Sequence: | 10 present $intro<br>20 present $clip<br>30 present "How is $character.name feeling here?"<br>40 present $choices<br>50 receive $choice<br>60 if $choice == $emotion present "Yes! $character.he is $emotion about $reason."<br>70 if $choice != $emotion present $explanation |

Fig. 6F

| Data ID: | toy-story-clip-64 |
|---|---|
| Data Type: | movie-clip |
| Intro1: | "Let's watch a scene from Toy Story." |
| Intro2: | "Woody makes me laugh." |
| Movie: | Toy Story |
| Clip: | (toy-story, 1:02:23, 1:03:02) |
| Recap1: | "Ha ha." |
| Recap2: | "That was a good one." |

Fig. 7A

| Data ID: | toy-story-who-said-23 |
|---|---|
| Data Type: | game-who-said |
| Movie: | Toy Story |
| Clip: | (toy-story, 0:34:45, 0:34:51) |
| Character: | 1766 |
| Choices: | [Andy, Woody, Buzz Lightyear, Andy's Mom] |

Fig. 7B

| Data ID: | joke-287 |
|---|---|
| Data Type: | joke |
| Movie: | beauty-beast |
| Setup: | What prize did Gaston win? |
| Punchline: | The no-Belle prize! |

Fig. 7C

| Data ID: | 85246 |
|---|---|
| Data Type: | emotion-lesson |
| Difficulty: | easy |
| Character: | 1854 |
| Emotion: | happy |
| Reason: | meeting a real Ferrari |
| Choices: | [happy, sad, angry, surprised] |
| Movie: | Cars |
| Clip: | (cars, 1:12:13, 1:12:45) |
| Intro: | "Let's watch something important happen in Luigi's shop!" |
| Explanation: | "He was happy be cause he met a real Ferrari for the first time." |

Fig. 7D

TRIGGERING A SESSION WITH A VIRTUAL COMPANION

CROSS-REFERENCES TO RELATED APPLICATIONS

This application is a continuation-in-part of and claims the benefit of U.S. patent application Ser. No. 15/166,507, titled "Requesting Assistance based on User State," and filed on May 27, 2016. U.S. patent application Ser. No. 15/166,507, titled "Requesting Assistance Based on User State," and filed on May 27, 2016; U.S. patent application Ser. No. 15/166,333, titled "On Demand Guided Virtual Companion," and filed on May 27, 2016; U.S. patent application Ser. No. 15/015,891, titled "Guided Personal Companion," and filed on Feb. 4, 2016; and U.S. patent application Ser. No. 14/571,472, titled "Digital Companions for Human Users," and filed on Dec. 16, 2014 are each hereby incorporated by reference in their entireties for all purposes.

BACKGROUND

Individuals with special needs, such as children with autism, may find it difficult to interact socially with other people, such as their parents, friends, and people they are meeting for the first time. These special needs individuals may have an easier time communicating with a computer-generated virtual companion, such as personal assistants or avatars on smartphones. While the special needs individual may be able to communicate more easily with a computer-generated virtual companion, the virtual companion may have limited capabilities and may not be able to provide functionality to assist the special needs individual.

BRIEF DESCRIPTION OF THE FIGURES

The invention and the following detailed description of certain embodiments thereof may be understood by reference to the following figures:

FIG. 4 is an example list of segments that may be presented by a Sidekick.

FIGS. 5A-5C illustrate examples of data that may be used to present a segment.

FIGS. 6A-6F illustrate example scripts that may be used to present a segment.

FIGS. 7A-7D illustrate example data items that may be used to present a segment.

DETAILED DESCRIPTION

Figure 1:
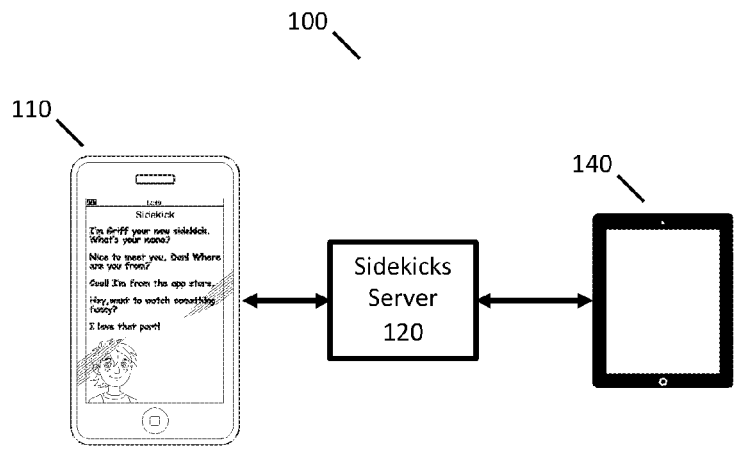
FIG. 1 is an example of a system where a Coach may guide how a Sidekick interacts with a Hero.

Described herein are techniques for assisting a special needs individual, who we will refer to as the "Hero," such as by assisting the Hero in learning life skills. The Hero may have difficulty in interacting with people and may be reluctant to speak or have difficulties when communicating with another person. For example, the Hero may have autism, attention deficit disorder, or Alzheimer's disease. The Hero may have an easier time communicating with a computer-generated character that is presented on a device, such as a smartphone. For example, the Hero may find it easier to speak to a virtual personal assistant, such as Apple's Siri, than to speak to another person.

In some implementations, the techniques described herein may be applied to other types of situations and other types of individuals. For example, the Hero may be a neuro-typical person and not have any special needs. The character presented by the device may serve any appropriate purpose or take any appropriate role for the Hero. For example, the character may serve as a friend, a personal coach, or a counselor to the Hero.

While the Hero may have an easier time communicating with an automated personal assistant, the personal assistant may not be particularly helpful in teaching the Hero skills, such as skills associated with emotional and physical regulation, social skills, executive functioning, interpersonal communication, and other aspects of our social culture that are typically not taught explicitly to those without special needs. What is needed is a computer-generated character that can interact with the Hero but also help the Hero, such as by helping the Hero learn skills or assist the Hero in navigating daily tasks. In some implementations, a Coach (described in greater detail below) may be able to help guide how the computer-generated character interacts with the Hero. For example, the Coach may be a parent or caretaker, and the Coach may be able to control or influence the words spoken by the computer-generated character.

The computer-generated character will be referred to herein as a virtual companion or a Sidekick (Sidekick and Sidekicks are trademarks of The Affinity Project). A Sidekick may be may be a new character created specifically for the purpose of communicating with a particular Hero or Heroes in general, or an existing cartoon character, such as Mickey Mouse, used with permission of the owner. A Sidekick may have an associated appearance, personality, and voice.

Individuals who guide how the Sidekick interacts with the Hero will be referred to as Coaches. Coaches may include any person who is assisting in guiding a Sidekick, such as parents, other family members, teachers, therapists, other medical professionals, or other individuals.

Coaches, Heroes, and Sidekicks may be characterized in ways and may interact with one another using, among others, any of the techniques described in U.S. patent application Ser. No. 15/166,507, titled "Requesting Assistance Based on User State," and filed on May 27, 2016; U.S. patent application Ser. No. 15/166,333, titled "On Demand Guided Virtual Companion," and filed on May 27, 2016; U.S. patent application Ser. No. 15/015,891, titled "Guided Personal Companion," and filed on Feb. 4, 2016; and U.S. patent application Ser. No. 14/571,472, titled "Digital Companions for Human Users," and filed on Dec. 16, 2014; each of which is hereby incorporated by reference in their entireties for all purposes.

FIG. 1 shows an example of a system 100 where a Coach may guide how a Sidekick interacts with a Hero. The Hero may have a Hero computing device 110, which may be a smartphone, smartwatch, tablet, or any other type of computing device. The Hero device 110 may have an application that allows the Hero to interact with a Sidekick. The Coach may have a Coach computing device 140, which may be a personal computer, tablet, smartphone, or any other type of computing device. Coach device 140 may have an application that allows the Coach to guide how the Sidekick interacts with the Hero. FIG. 1 shows only one Hero and one Coach, but a single Hero may interact with multiple Coaches and vice versa.

In some implementations, the overall service that allows a Hero to interact with a Sidekick will be referred to as the "Sidekicks service." A company may provide the Sidekicks service that allows Heroes and Coaches to communicate as set forth in the system 100 of FIG. 1. For example, a company may provide software that can be installed on or used with a Hero Device and a Coach device (e.g., an installed application or a web page) and may also provide access to server computers, such as server 120, that provides, among other things, the functionality described herein.

For clarity in the presentation, (i) an example Hero device will be generally described as a smartphone that has a touchscreen, camera, microphone, and speakers, where the Hero interacts with the device by touching or viewing the screen, speaking into the microphone, listening to audio from a speaker, or making use of the camera; (ii) an example application on the Hero device will be generally described as a special-purpose application installed on the smartphone (such as installed from an app store); (iii) an example Coach device will be generally described as a personal computer where the Coach interacts with the device by clicking a mouse, typing on a keyboard, listening to audio from a speaker, or dictating commands; and (iv) an example application on the Coach device will be generally described as a web browser displaying a web page of the Sidekicks service. The techniques described herein are not, however, limited to these particular types of devices and applications running on the devices, and the devices need not have all of (or any particular combination of) the characteristics described above. For example, the Hero device may instead be a personal computer that the Hero uses to access web page using a browser, and the Coach device may instead be a phone or a tablet with a special purpose application.

The Hero may open an application on Hero device 110 to begin interaction with the Sidekicks service. The application may present a graphic of a Sidekick and welcome the Hero by playing a greeting, such as "Welcome Dan!" by using a text-to-speech (TTS) voice created for the Sidekick. The Hero may speak to the Sidekick, and the Hero's voice may be captured by a microphone of Hero device 110, transmitted to the Coach device 140, and played, in real time, on speakers of the Coach device 140. In some configurations, the Hero might communicate with the Sidekick by using a keyboard or a virtual keyboard. Even when the Hero communicates using a keyboard or is not communicating at all, audio captured by a microphone of the Hero device may still be transmitted to the Coach so that the Coach can better understand the Hero's environment and mood.

The Coach may then determine an appropriate response for the Sidekick to speak. The Coach may type the response on Coach device 140. The Coach may also provide the response by speaking and using automated speech recognition to generate the response text. The text of the response may then be converted to audio using the TTS voice of the Sidekick, and the audio may be played from Hero device 110, and/or be displayed on the Hero device 110, so that it is not apparent to the Hero that the Sidekick is being guided by a Coach.

System 100 may have a Sidekicks server 120 that assists with the above interactions. For example, Sidekicks server 120 may facilitate network connections between Hero device 110 and Coach device 140, may perform operations such as generating audio using the TTS voice of the Sidekick, may identify Coaches to assist a Hero, or may perform any other operation to assist with the above interactions, among other activities.

Automated Sessions

In some implementations or situations, the Sidekicks service may allow a Hero to interact with the Sidekick without the assistance of a Coach and operations or responses of the Sidekick are automated in that they are generated by a computer program. A Hero may start a session with an automated Sidekick in a similar manner to starting a session where the Sidekick is guided by a Coach. In some implementations, the Hero may specifically request a Sidekick that is automated or a Sidekick that is guided. For example, there may be an option on a user interface to specify the type of Sidekick.

In some implementations, some Sidekicks may always be automated and other Sidekicks may always be guided. For example, a user interface may present several Sidekicks, and each Sidekick may have a different name, appearance, or personality. Some of the presented Sidekicks may be automated and some of them may be guided by a Coach. It may or may not be apparent to the Hero which Sidekicks are automated.

In some implementations, a particular Sidekick may be either automated or guided and interactions within a single session may include some interactions that are automated and some interactions that are guided by a Coach. For example, a Sidekick may have multiple modes of operation where one or modes correspond to an automated Sidekick and one or more modes correspond to a guided Sidekick. In some implementations, a Sidekick may be automated or guided by a Coach depending on the availability of a Coach or the preference of the Hero at a given time. As used herein, an automated Sidekick refers to a Sidekick where at least some interactions with the Sidekick are automated but not all interactions with an automated Sidekick need to be automated and some interactions may be guided by a Coach.

A session with a Sidekick may start in a variety of ways. A Hero may open an app on a device (e.g., a smartphone app) and select a Sidekick, or a Sidekick may always be running on the Hero device. In some implementations, a session with a Sidekick may be started without any action by the Hero. For example, another person may cause a session with a Sidekick to start, or a session with a Sidekick may be triggered by an event as discussed in greater detail below. A session with a Sidekick may continue until ended by a Hero or some other cause for ending the session.

A session with an automated Sidekick may comprise a sequence of segments. A segment may be any sequence of interactions between the Hero and the Sidekick. A segment may have a topic or a purpose. For example, a segment may correspond to an introductory segment to start a session, a concluding segment to end a session, watching a video clip together and commenting on it, a game, a joke, or a lesson.

A session may have any number of segments, and the segments may be determined ahead of time or may be determined in other ways, such as randomly. For example, segments may be presented to the Hero sequentially until a session is ended.

Figure 2:
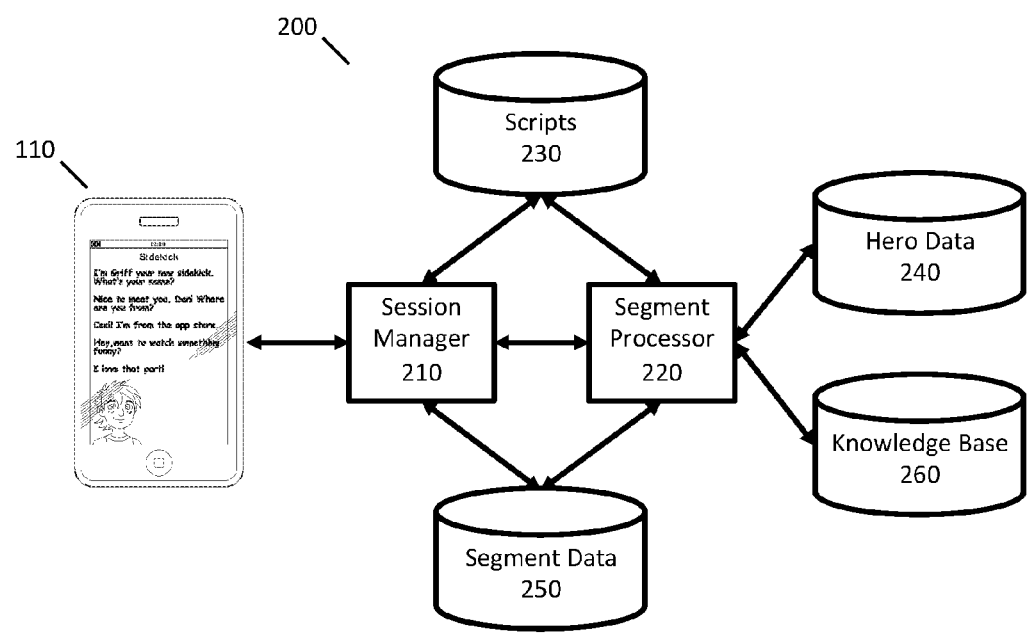
FIG. 2 is an example of a system where a Hero may interact with an automated Sidekick.

FIG. 2 shows an example of a system 200 where a Hero may interact with an automated Sidekick. In FIG. 2, a Hero may use Hero device 110 to interact with the automated Sidekick, and the Hero device may include any type of device described herein. For example, the Sidekick may be presented on a display of the Hero device, the Sidekick may communicate with the Hero by presenting audio using text to speech or presenting text, and the Hero may communicate with the Sidekick by speaking or typing.

The other components of FIG. 2 may be configured in any appropriate way. In some implementations, all the components of FIG. 2 may be on Hero device 110, all the components may be on other devices (such as one or more server computers), or some components may be on Hero device 110 and some components may be on other devices.

FIG. 2 includes a session manager component 210 that may be used to manage aspects of a session with an automated Sidekick. The session manager component 210 may perform any operations relating to presenting the Sidekick on Hero device 110, processing input received from the Hero, or selection and presentation of the overall session, such as selection and presentation of segments during the session.

Session manager component 210 may select segments using any appropriate techniques, and several example techniques are discussed in greater detail below. Session manager component 210 may start with an introductory segment. For example, multiple introductory segments may be available, and session manager component 210 may select one randomly. Session manager component 210 may then select other segments. For example, session manager component 210 may operate in a loop where each iteration of the loop selects a type of segment, such as a joke or a lesson. The selection of a segment type may be deterministic (e.g., repeating a game, a joke, and a lesson) or may be done randomly (e.g., 10% chance of a joke at each iteration of the loop).

In some implementations, a segment may be selected by selecting a script and segment data. A script may specify a sequence of interactions between the Sidekick and the Hero. For example, FIG. 6A presents one example of a script that may be used to generate a segment. FIG. 6A illustrates a greeting script that may be used to start a session with a Hero. In this example script, a sequence of interactions is presented using a simple programming language, such as instructions similar to the BASIC programming language. A script, such as the script of FIG. 6A, may have variables. For example, in FIG. 6A, the variables start with a dollar sign. These variables may be a placeholder for data that is obtained in other ways. Accordingly, to present a segment using the script, data may also be selected to choose values for the variables, and this data may be referred to as segment data. For example, segment data may be selected where $greeting1 is "Good morning!" and $greeting2 is "Good to see you again." By combining the script with the segment data, these two phrases may be presented sequentially by the Sidekick to the Hero. Scripts may be created and combined with segment data in other ways as well, and scripts are not limited to the foregoing example.

In some implementations, session manager component 210 may have access to a script data store 230 and a segment data store 250. Scripts data store 230 may store scripts that may be used to create a variety of segments. For example, scripts data store 230 may have one or more scripts relating to different types of segments, such as jokes, games, and lessons. Segment data store 250 may store segment data that may be combined with a script to present a segment to the Hero. Segment data may be in the form of segment data items, such as a structured data item. Each segment data item may correspond to a script. For example, there may be 100 segment data items corresponding to jokes, and each of the joke segment data items may be combined with a joke script to present a joke to the Hero. In some cases, segment data items may be combined with different types of scripts.

FIG. 2 includes a segment processor component 220 that may be used to present a segment to a user. In some implementations, segment processor component 220 may receive a selection of a script and a selection of a segment data item, and segment processor component 220 may combine them to generate data that may be used to present the segment to the Hero, such as generating text or speech generated using a text-to-speech algorithm.

In some implementations, segment processor component 220 may receive information from session manager component 210 to process a segment. For example, segment processor component 220 may receive an identifier of a script, an identifier of a segment data item, and an identifier of the Hero. Segment processor component 220 may use this information to retrieve needed information and generate data to present the segment to the Hero. For example, segment processor component 220 may retrieve a script from scripts data store 230, a segment data item from segment data store 250, retrieve information about the Hero from Hero data store 240, and retrieve other data from knowledge base data store 260. Knowledge base data store 260 may include any other data that may be used to facilitate the presentation of a segment to a Hero. For example, knowledge base data store may include information about movies or characters in movies.

Session manager component 210 and segment processor component 220 may work together to present a segment to a Hero. For example, segment processor component 220 may generate first data for a first phrase to be presented by the Sidekick and transmit the first data to session manager component 210. Session manager component 210 may then use the first data to cause the Sidekick to present the first phrase, for example, by causing text to be displayed on Hero device 110 or causing audio to be played from Hero device 110.

System 200 may then continue to present the segment to the Hero. For example, segment processor 220 may generate second data for a second phrase, and session manager component 210 may cause the second phrase to be presented to the Hero. In some implementations, the segment may include receiving input from the Hero (e.g., multiple choice, typed, or spoken), and session manager component 210 and segment processor component 220 may use this received information to generate subsequent phrases to be presented by the Sidekick.

Figure 3:
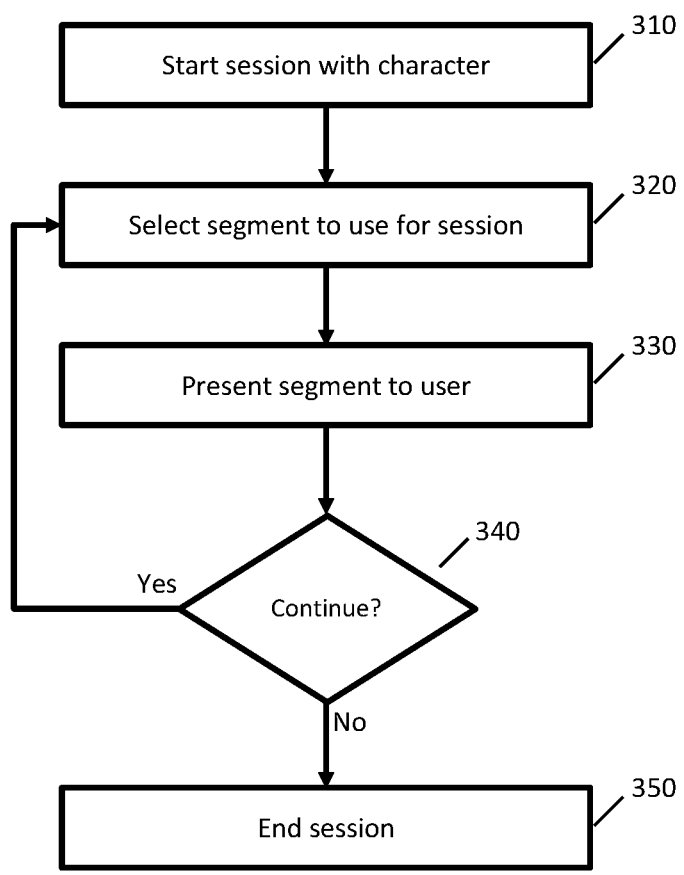
FIG. 3 is a flowchart illustrating an example implementation of a session between a Hero and a Sidekick.

FIG. 3 is a flowchart illustrating an example implementation of a session between a user (e.g., a Hero) and a character (e.g., a Sidekick). In FIG. 3, the ordering of the steps is exemplary and other orders are possible, not all steps are required and, in some implementations, some steps may be omitted or other steps may be added. The process of the flowcharts may be implemented, for example, by any of the computers or systems described herein.

At step 310, a session between a user and an character is started. For example, a user may open an app on a user device (e.g., a smartphone) to begin a session with the character. In some implementations, the user may take other actions after opening the app, such as selecting between an automated character and another character that is not automated or selecting a mode of operation for a character (e.g., automated or guided). In some implementations, the user may start a session by speaking to a user device. For example, the user may speak the name of the character or speak some other phrase to start a session. In some implementations, the user may not explicitly start the session. For example, the session may be started by another person or started by an event or a trigger, as discussed in greater detail below.

At step 320, a segment is selected for the session, and in some implementations, segment selection may be implemented by session manager component 210. A segment may be selected using any suitable techniques. In some implementations, a segment may be specified from a pre-specified list of segments, where the list was created by another person, such as a parent or therapist of the user. In some implementations, a segment may be selected randomly or randomly with constraints (such as rules) that limit the random selection. For example, a joke may be selected 10% of the time, but no more than three joke segments in a row may be presented. In some implementations, the user may select a segment. For example, the user may type or speak a desired segment, such as "Tell me a joke." In some implementations, the segment selection process may be customized to individual users. Additional examples of segment selection are described in greater detail below.

At step 330, a segment is presented to the user, and in some implementations, segment presentation may be implemented by one or both of session manager component 210 and segment processor component 220. A segment may include one or more interactions between the character and the user. For example, the character may present a phrase to the user (e.g., as text or speech), input may be received from the user (e.g., multiple choice, text, or speech), or other interactions may occur, such as watching a video clip. The interactions of a segment may be presented sequentially until the segment is complete. For example, a segment may be implemented using a script and segment data, as described in greater detail below.

At step 340, it is determined whether to continue the session and present another segment. Any appropriate techniques may be used to determine whether to present another segment. In some implementations, the number of segments to be presented may be determined in advance or segments may continue to be presented until the user takes an action to end the session. If it is determined to present another segment, processing may return to step 320 where another segment is selected to be presented to the user. If it is determined to not present another segment, then processing may continue to step 350 where the session is ended. In some implementations, a final segment, such as a good bye segment, may be presented to emulate a goodbye in a human conversation, and then the user device may present an indication that the session has ended.

Segment Processing

In some implementations, a segment may be presented to a Hero by combining a script and a data item. For example, a segment may be specified by an identifier of a script (script ID) and an identifier of a data item (data item ID). FIG. 4 presents an example list of segments, where script IDs and data item IDs are used to specify the segments.

In FIG. 4, the first segment has the script ID "hello" and the data item ID is blank. The hello segment may be a segment that provides a greeting to the Hero, and presenting a greeting may not require a data item. Accordingly, the data item ID may be left blank. The second segment has the script ID "play-clip-fun" and the data item ID is "toy-story-clip-64." The script for play-clip-fun may be a script that plays a video clip to the Hero just to amuse the Hero. This script may be constructed so that it may be used with different movie clips from different movies. The data item toy-story-clip-64 may include data that allows the segment to be presented, such as the start and stop times of the clip and phrases to be presented before or after the clip.

Similarly, the third, fourth, and fifth segments each have script IDs and data item IDs that may be used to present a segment to the Hero. Segment three is for a game, segment four is for a joke, and segment five is for a lesson to teach the Hero about emotions. The last segment is a goodbye segment to conclude the session, and as with the hello segment, no data item may be needed for the goodbye segment. The identifiers for scripts and data items may take any appropriate form and need not be meaningful to users. For example, each identifier may simply be a number.

When presenting a segment using a script, data from a corresponding data item and from other resources may be used to customize and/or personalize the script. In some implementations, a script may include variables, and these variables may be replaced by corresponding text before causing a phrase to be presented to the Hero. For example, a variable $name may represent the name of the Hero and the variable $title may represent the title of a movie that is played to the Hero. Note that a variable may be denoted using any appropriate techniques and need not start with a dollar sign.

FIG. 5A illustrates an example of a Hero profile that may be used when presenting a segment using a script. In FIG. 5A, the Hero profile includes example information about the Hero, such as the Hero's name, age, gender, affinities (things the Hero likes), and goals (skills the Hero is working on improving). As used herein, a "profile" comprises any format for storing information about a person in a data store and is not limited to any particular structure or organization. As noted above, a script for presenting a segment to a Hero may include a variable for the Hero's name. For example, a script may start with the phrase "Hi $name," where $name is a variable for the Hero's name. When processing the script, an identifier of the Hero may be used to obtain the Hero's profile (e.g., from Hero data store 240), the name of the Hero may be obtained from the profile, the $name variable may be replaced with the name of the Hero, and the phrase "Hi Dan" may be presented by the Sidekick.

FIG. 5B illustrates an example of a global phrase list that may be used when presenting a segment using a script. A global phrase list may include data that may be used with multiple Heroes or multiple scripts. For example, multiple scripts may present a greeting to a user, and the text of a greeting may be obtained from a global phrase list. Similarly, a script may include a variable to indicate that something was funny, such as $laugh, and text for this variable may be retrieved from the global phrase list. In some implementations, a global phrase list may be stored in knowledge base data store 260.

In FIG. 5B, the phrase list is presented as a list of variable names and corresponding phrases that may be used for the variable name. Each variable name may be associated with more than one phrase to provide variety in generating segments. For example, the variable $greeting1 has four phrases associates with it. Each time, the $greeting1 variable is used, one of the four phrases may be selected randomly or the phrases could be used in order. In some implementations, the phrases in the global phrase list may further include variables that may be replaced from other data sources. For example, in the phrase "Hey $name," the $name variable may be replaced using the Hero profile.

FIG. 5C illustrates another example of data that may be used when processing scripts to generate segments. FIG. 5C includes a list of information about characters in movies. For example, each character may be associated with a unique identifier, an identifier of a movie or movies the character appears in, the name of the character, the gender of the character, whether the character is singular or plural, and the age of the character. This information may be used to generate phrases about the character. For example, a script may include the phrase "I like $character.name, $character.he is so funny." The variable $character may be a unique identifier of the character, $character.name may indicate the name of the character from the character list, and $character.he may use the gender from the character list to choose the appropriate pronoun (e.g., "he," "she," or "it"). In some implementations, a character list may be stored in knowledge base data store 260.

FIG. 6A-6F illustrate examples of scripts that may be used to present segments. Each script may include information to assist in presenting the script. For example, a script may have a script ID, may indicate one or more types of data items that may be used with the script, and may include information that may be used to present a sequence of interactions with the Hero (referred to as a "sequence"). A script may also include other information, such as a skill level or difficulty level of a script. The skill level may be used to select scripts that are appropriate for the skill level of the Hero.

A script ID may be any type of identifier that may be used to identify the script. For the examples presented herein, the identifiers indicate the contents of the script but the identifiers may not be informative. A "data item type" may indicate one or more types of data items that may be used with a script. For example, for the "hello" script of FIG. 6A no data items may be needed, and "data item type" may be set to "None." For the "play-clip-fun" script of FIG. 6C, both movie clip data items and television clip data items may be used with the script.

A script sequence may include any appropriate information that may be used to present a sequence of interactions between the Hero and the automated Sidekick. In the examples of FIG. 6A-6F, the sequences are presented using a simple programming language that is similar to the BASIC programming language. In some implementations, the sequence may be presented as text, using a spreadsheet format (e.g., comma separated values), using structured data (e.g., JSON or XML), or using any other appropriate techniques.

A script sequence may include any appropriate indications for branching, looping, or any other appropriate flow control. For example, a script may include any variants of if-then-else statements, switch statements, for loops, while loops, or goto statements. A script sequence may also include any appropriate indications for presenting information (e.g., phrases or video clips) to the Hero or receiving input from the Hero.

FIG. 6A presents an example of a "hello" script that may be used to greet the Hero at the beginning of a session. The script may not need any data items and present two phrases in sequence using two different variables. Values for the variables may be obtained, for example, using a global phrase list. Similarly, FIG. 6B presents an example of a "goodbye" script with similar features as the hello script.

FIG. 6C presents an example of a script to play a video clip to a Hero, where the script has an ID of play-clip-fun. This script may operate with data items of type movie-clip and TV-clip. The sequence of the script may present two phrases to introduce the video clip, may play the video-clip, and may present two phrases after the video clip. Each line of the sequence incudes a variable, and in some implementations, the values for the five variables may be obtained from a data item that is used with the script, such as the data item illustrated in FIG. 7A. FIG. 7A represents a data item of type movie-clip and includes values for each of the five variables of the play-clip-fun script.

FIG. 6D presents an example of a script to play a game with the Hero where the script has an ID of game-who-said. For this game, an audio clip of a character in a movie is played, and the Hero guesses the name of the character. This script uses a data item of type game-who-said, and FIG. 7B illustrates an example of a data item with this type. The first two lines of the sequence introduce the game and do not use any variables. The third line causes the clip to be presented to the Hero, where the clip is specified by a data item. The fourth line presents the phrase "Who said that?" The fifth line presents choices in multiple choice format where the choices are obtained from the data item. In some implementations, the Hero may provide an answer to the question by speaking or typing instead of selecting one of multiple choices. The sixth line receives the choice selected by the Hero and stores it in the variable $choice. The seventh line presents the phrase "Right!" if the Hero had the right answer. In some implementations, for the seventh line, the $character variable may retrieve an identifier of the character from the data item, and $character.name may indicate the name of the character obtained from the character list of FIG. 5C. The eighth line presents the phrase "Nope that was $character.name" if the Hero had the wrong choice (where the $character.name variable may be filled in as described above).

FIG. 6E presents an example of a script to tell a joke to the Hero where the script has an ID of joke. This script uses a data item of type joke, and FIG. 7C illustrates an example of a data item with this type. The joke script presents four phrases to the Hero. The first phrase does not use variables, the second and third phrases use variables that are provided in the data item, and the fourth phrase uses a variable that is provided from the global phrase list.

FIG. 6F presents an example of a script to present a lesson to the Hero where the script has an ID of emotion-lesson. For this lesson, a clip of a movie is played to teach the Hero about an emotion felt by a character in the clip. This script uses a data item of type emotion-lesson, and FIG. 7D illustrates an example of a data item with this type. The sequence of the example emotion lesson is similar to the sequence for the game-who-said script above.

Figure 8:
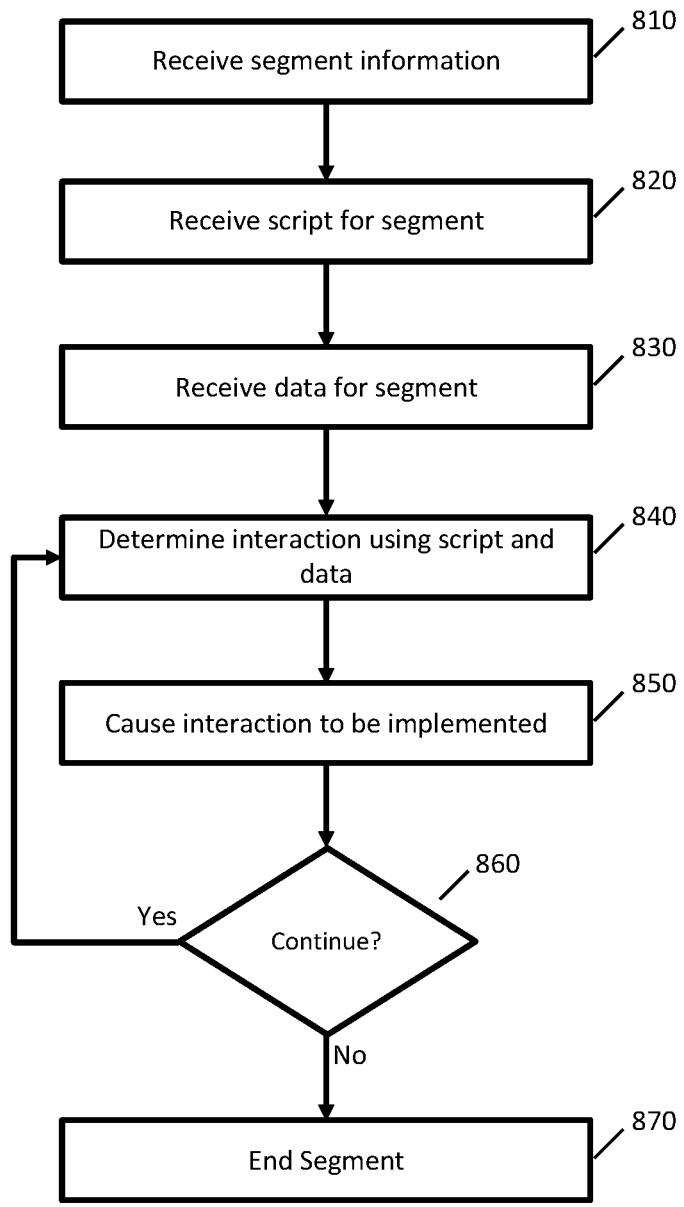
FIG. 8 is a flowchart illustrating an example implementation of presenting a segment using a script and a data item.

FIG. 8 is a flowchart illustrating an example implementation of presenting a segment using a script and a data item. In FIG. 8, the ordering of the steps is exemplary and other orders are possible, not all steps are required and, in some implementations, some steps may be omitted or other steps may be added. The process of the flowcharts may be implemented, for example, by any of the computers or systems described herein, such as segment processor component 220.

At step 810, information about a segment is received. The information may include any information that may be used to identify a script and data that may be used with the script. For example, the information may include an identifier of a script and an identifier of a data item. In some implementations, the information may also include an identifier of the user (e.g., a Hero) to whom the segment will be presented.

At step 820, the script is received. For example, the script may be retrieved from a data store, such as scripts data store

230, using an identifier of the script. The script may be specified in any appropriate format, such as using a programming language, and the script may include variables, where the variables may be replaced by data, such as text obtained from a data item.

At step 830, data is received to be used with the script. For example, a data item may be retrieved from a data store, such as segment data store 250, using an identifier of the data item. The data item may be in any appropriate format, such as a structured data format (e.g., JSON or XML). In some implementations, data about the user may also be received. For example, data about the user may be retrieved from a data store, such as a Hero data store 240, using an identifier of the user. In some implementations, other data may be retrieved from a data store, such as knowledge base data store 260. The other data may include any data that may be used to present a segment to a user. For example, the other data may include a global phrase list or a character list.

At step 840, an interaction is determined using the script and the data. For example, for an iteration of determining an interaction, a first interaction may be determined using a first line of a script. Where the first line of the script includes a variable, data may be obtained corresponding to the variable and used to determine the interaction. The interaction may include any of the interactions described above, such as causing a phrase to be presented to the user, playing a video clip, or receiving input from the user.

At step 850, the interaction is implemented. For example, the interaction may be implemented by causing a phrase to be presented by a character on the user device, causing a video clip to be played on the user device, or receiving input from the user. For example, the character may speak a phrase using a text-to-speech voice of the character, a phrase may be presented on a display of the user device, the user may select a user interface element to provide input (e.g., multiple choice), or the user may speak or type to provide input.

At step 860, it is determined whether to continue presenting the segment. Any appropriate techniques may be used to decide whether to continue presenting the segment. For example, the segment may continue as long as subsequent lines of the script remain to be executed. If it is determined to continue the segment, then processing proceeds to step 840 where a next interaction is determined. The next interaction may correspond to a next line of the script and account for any flow control instructions (e.g., if-then-else statements) and data received from the user. If it is determined not to continue the segment, then processing proceeds to step 870 where presentation of the segment is ended. After ending a segment, other segments may be presented as described in FIG. 3.

Segment Selection

As described above, one or more segments may be presented to a Hero where the Hero is interacting with an automated Sidekick presented by the Hero device. When presenting one or more segments to the user, the segments may need to be selected, either ahead of time or during a session, and further details of segment selection are now presented.

In some implementations, the segments may be selected by a person other than the Hero. For example, a parent, a medical professional treating the Hero, or a Coach may select a list of segments to be presented to the Hero. The list may be determined ahead of time, and the segments on the list may be presented sequentially to the Hero. In some implementations, the segment list may be fully specified in that the precise sequence of interactions are known ahead of time. In some implementations, the segment list may be partially specified where some aspects of the list may be determined randomly. For example, a partially specified segment list may include the following: tell a randomly selected joke, play a clip for fun from the Toy Story movie, present an emotion lesson using a clip from the Toy Story movie, and play a randomly selected game.

In some implementations, the segments may be selected by the Hero. The Hero may speak a desired segment or provide other inputs (e.g., typing or navigating a menu of possible segments) to select a segment to be presented. The Hero may be able to full specify a segment or partially specify a segment where some aspects of the segment are determined randomly. For example, the Hero may be able to select an emotion lesson for identifying or understanding anger using a particular clip from a movie, or the Hero may be able to select an emotion lesson for anger with a randomly selected clip.

In some implementations, segments may be selected randomly. When selecting segments randomly, different weights may be given to different aspects of a segment. For example, where a segment is specified using a script and a data item, a joke may be presented 20% of the time, a game may be presented 30% of the time, a video clip may be presented 35% of the time, and an emotion lesson may be presented 15% of the time. Various aspects of a segment may be selected randomly. For example, a first random selection may select an emotion lesson script, a second random selection may select an emotion to use for the emotion lesson, a third random selection may select a movie to use in the lesson, and a fourth random selection may select a particular clip from the selected movie.

In some implementations, the random selections may be customized to individual Heroes using rules. For example, a Hero or other person (e.g., parent or medical professional) may specify one or more rules or parameters for the random selection. For example, where a Hero especially likes games, the probability of a game being selected may be increased. For movie clips to be used with segments, the selection of a movie may be limited to movies that the Hero likes. For lessons, the selection of a lesson may be limited to skills currently being worked on by the Hero. Other information about the Hero may also be used to limit the segment selection. For example, a Hero may have a skill level for particular skills (e.g., understanding anger), and the skill level of the Hero may be used to select a segment that matches his skill level.

In some implementations, the customization of the segment presentation for a Hero may be learned from evaluations or feedback relating to a segment. For example, after presenting a segment to the Hero, the Hero may be asked to evaluate the segment (e.g., a thumbs up or thumbs down or a rating of 1 to 5 stars). In some implementations, the evaluations may be determined automatically or without an explicit evaluation by the Hero. For example, if a Hero skips a segment or ends a session during a segment, these actions may indicate that the Hero did not like the segment. These evaluations may be used to influence future segment selection. For example, if a Hero gives a thumbs down to a video clip for a particular movie, the probability of selecting a video clip segment may be reduced, the probability of selecting a segment using that movie may be reduced, and/or the probability of selecting that particular video clip may be reduced.

In some implementations, the customization of the segment presentation for a Hero may be learned by processing transcripts of sessions with the Hero where the Sidekick was being guided by a Coach. Statistics may be computed for guided sessions, such as the types of segments presented (e.g., game, lesson, etc.) and data used for the segments (e.g., movies). These statistics may be used to set various parameters of an automated session with the Hero, such as probabilities for selecting various aspects of a segment.

In some implementations, random selections may be constrained to improve the overall experience for the Hero. In some implementations, a history of segments presented to the Hero may be stored and the segment history may be used when selecting a segment to ensure variety in the presentation of segments. For example, a constraint may prevent telling the same joke more than once in a week, or a constraint may ensure that no more than three game segments may be presented in a row.

In some implementations, segment selection may be implemented to achieve a longer term goal for the Hero. For example, the goal may be for the Hero to better identify or understand a particular emotion, such as anger. A Hero may have a skill level corresponding to the goal, such as a skill level of 3 on a scale of 1 to 10. During a session with the Hero, one or more segments may be selected to help the Hero improve his skill level for the goal, such as a segment presenting a lesson on understanding anger using a movie clip. The segment selected to help the Hero improve his skill level for the goal may be based on the Hero's current skill level. For example, when the Hero's skill level is lower, easier lessons may be selected, and when the Hero's skill level is higher, harder lessons may be selected. When the Hero successfully completes one or more lessons, the Hero's skill level may be increased. For example, where the Hero successfully completes three anger lessons in a row at level 3, the Hero's skill level may be increase to level 4. Accordingly, over a time period spanning multiple sessions, the Hero may continue to be presented with segments to help the Hero work on his goal, and as the Hero's skill level increase, the lessons may become more difficult to help the Hero achieve the next level.

In some implementations, segments may be selected using data collected during the session, which will be referred to as session data. Session data that may be used to influence segment selection may include any of the following: time of day, day of the week, location, motion of the Hero device (e.g., as determined by motion sensors), weather, an emotional state of the Hero (e.g., as determined using sensors of the Hero device), words typed or spoken by the Hero (e.g., if the Hero states that he is sad, a lesson about sadness may be selected), or upcoming events in a calendar of the Hero (e.g., the Hero has a dentist appointment in 30 minutes).

Any appropriate techniques may be used to select segments using session data. For example, aspects of segments may be given a higher probability under particular circumstances or may only be considered during particular circumstances. How session data is used to select a segment may be specific to an individual Hero and may be learned or specified by a parent of the Hero or another person. The following are examples of using session data to select a segment for a Hero: select a script relating to taking the bus to school before 8 am; select a script relating to preparing for bed after 8 pm; select a lesson relating to fear during a thunderstorm; select a happy video clip after determining that the Hero is sad using sensors of the Hero device; select a lesson about staying calm if the Hero is yelling; select a lesson for dealing with stressful situations when the Hero mentions a bully; select a lesson relating to going to the dentist if the Hero has a dentist appointment in the next 24 hours.

Session Trigger

As described above, a Hero may take an action to start a session with an automated Sidekick. In some implementations, a session between a Hero and an automated Sidekick may be started in other ways. For example, the occurrence of an event, which may be referred to as a trigger event, may cause a session to be started between the Hero and the automated Sidekick. Any of the session data described above may be used to determine if an event trigger has occurred and to start a session in response to the event trigger. For example, an event trigger may include one or more of the following: when the Hero wakes up in the morning, when the Hero leaves the House, when the Hero has a certain emotional state as determined using sensors of the Hero device, when the Hero speaks a particular word or phrase, when the Hero is yelling, when a Hero has a dentist appointment in an hour.

An event trigger may be specified by the Hero or may be specified by other people, such as a parent of the Hero. Any appropriate user interface may be used to specify a list of event triggers. For example, a user interface may allow a person to specify a list of event triggers where each event trigger corresponds to the occurrence of one or more actions (e.g., the Hero is yelling) or situations (e.g., dentist appointment in one hour).

In some implementations, an emotional state of the Hero may be an event trigger. The emotional state of the Hero may be determined using a wide variety of sensors that may be used to monitor the Hero. The following are non-limiting examples of data that may be used for an event trigger: processing speech of the Hero from an audio signal received from a microphone of the Hero device; processing video of the Hero from a video signal received from a camera of the Hero device; or processing biometric data, such as received from a heart rate sensor or a galvanic skin response sensor.

Any suitable techniques may be used to determine an emotional state of the Hero using data received from the Hero device. For example, any classifier may be used to classify the state of the Hero. In some implementations, neural networks or deep learning may be used to process all of the data received from the Hero device to determine the state of the Hero. In some implementations, the data from each sensor may be used to determine a state of the Hero and the results from the different sensor data may be combined using sensor fusion techniques or a rule-based approach.

In some implementations, more specific detection techniques may be used to determine a state of the Hero. For example, a crying detector, a yelling detector, or a stimming detector (self-stimulation that may be performed by Heroes with autism). Classifiers may be trained by using data from multiple Heroes or from only the Hero for whom the classifier is being created. For example, sensor data may be collected from Hero devices and the data may be labelled as corresponding to an emotional state. The labelled data may then be used to train a classifier to automatically determine the state.

The state of the Hero may be indicated using any suitable techniques. In some implementations, the state of the Hero may be selected from one of a fixed number of possibilities (e.g., normal, happy, sad, angry, scared, or anxious). In some implementations, the determined state of the Hero may be accompanied by a severity score, such as a severity score in the range of 1 to 10, where 10 is the highest severity level and 1 is the lowest severity level. For example, the state of the Hero represented as the combination of "anxious" and 10 would indicate that the Hero is extremely anxious.

In some implementations, event triggers may be based on determinations other than the emotional state of the Hero, such as any of the following: processing an image from a camera of the Hero device, determining a word or a meaning of words spoken by the Hero, determining a word or a meaning of words spoken by someone other than the Hero, determining that another person is near the Hero using sensors of the Hero device (e.g., audio, video, or detecting nearby devices using a wireless communication radio), processing data from a motion sensor of the device (e.g., moving in a movie theatre or rocking violently in class), or comparing information about an event in a calendar of the Hero to a current date or time.

Monitoring may be used to determine if an event trigger has occurred. For example, data from sensors of the Hero device may be monitored and/or a calendar of the Hero may be monitored. The monitoring may occur at regular time intervals. For example, every 5 minutes, sensor data from the Hero device may be processed and events in a Hero calendar may be compared to the current time. At each time interval, the data may be processed to determine whether an event trigger has occurred.

In some implementations, the Hero device may only monitor the state of the Hero when the Hero is using a specific application on the Hero device, such as speaking to a Sidekick using the Sidekicks application. In some implementations, the Hero device may monitor the state of the Hero when the Hero is using the Hero device for any purpose (e.g., using an application other than the Sidekicks application). In some implementations, the Hero device may be monitoring the Hero even when the Hero is not using the Hero device. For example, the Hero device may monitor the Hero even when the Hero device is in the pocket of the Hero, in a bag of the Hero, or across the room from the Hero.

In some implementations, the monitoring of the Hero may proceed in various stages to protect the privacy of the Hero. For example, the Hero may have a watch or activity band that is always monitoring the heart rate of the Hero. If the heart rate indicates that additional monitoring would be helpful, then other sensors of the Hero device or another Hero device (e.g., when a smartphone is paired with a watch or an activity monitor) may be activated to obtain more information about the state of the Hero, such as activating a microphone or camera to obtain speech or video of the Hero.

The activation of additional sensors may proceed in multiple stages and may depend on an initial evaluation by sensors that are already monitoring the Hero. For example, initially, the only sensor monitoring the Hero may be a heart rate sensor. If the processing of the heart rate sensor data indicates that the Hero is very stressed, then all available sensors may be immediately turned on to obtain as much information as possible about the Hero. If the processing of the heart rate sensor data indicates that the Hero is mildly stressed, then one additional sensor (e.g., microphone) may be enabled. Depending on the combined processing of the heart rate sensor data and audio data from the microphone, additional sensors may then be enabled to better determine the state of the Hero.

After it is determined that a trigger event has occurred, a session is started with the Hero and the automated Sidekick. Where the Hero is using the Hero device but not interacting with the Sidekick application, any suitable techniques may be used to present the Sidekick to the Hero. For example, a notification may be presented on the display of the Hero device or the Sidekicks application may be automatically opened and presented to the Hero (causing the application the Hero was previously using to be switched to the background or stopped).

When the Hero is not interacting with the Hero device, any suitable techniques may be used to get the attention of the Hero. For example, audio may be played from speakers of the Hero device (e.g., at high or maximum volume), the display of the Hero device may turn on, a camera flash may be activated, or the Hero device may vibrate. When the Hero picks up the Hero device, the Sidekick may be automatically displayed and communicating with the Hero. In some implementations, the Sidekick may get the attention of the Hero, by specifically addressing the Hero, such as by speaking, "Dan, this is Griff, I want to speak with you. Pick up your phone."

A session between the Hero and the automated Sidekick may then begin. In some implementations, the Sidekicks application may start presenting the first segment in the session regardless of whether the Hero is currently using the Hero device. In some implementations, sensors of the Hero device may be used to determine if the Hero is near the Hero device (e.g., using cameras of the Hero device), and start the first segment when the Hero is present. In some implementations, the first segment will be presented after the Hero starts using the Hero device, such as by picking it up and looking at the screen. In some implementations, the Hero may be required to take some action to start the first segment, such as pressing a "start" button. The Hero may then interact with the automated Sidekick as described above.

The occurrence of an event trigger may be used to select segments to present to the Hero. For example, any of the techniques described above may be used to select segments to present to the Hero, such as using session data to select segments. In some implementations, segments to be presented in response to a trigger event may be explicitly specified. For example, if the trigger event is that the Hero is stressed, the first three segments that are presented to the Hero may include: calming music, a lesson on handling stress, and a fun video clip. In some implementations, an event trigger may be associated with a list of segments, and one or more segments may be selected from the list of events associated with the event trigger. After segments are presented as a result of the event trigger, the session may end, or the session may continue using any of the segment selection techniques described above.

Figure 9:
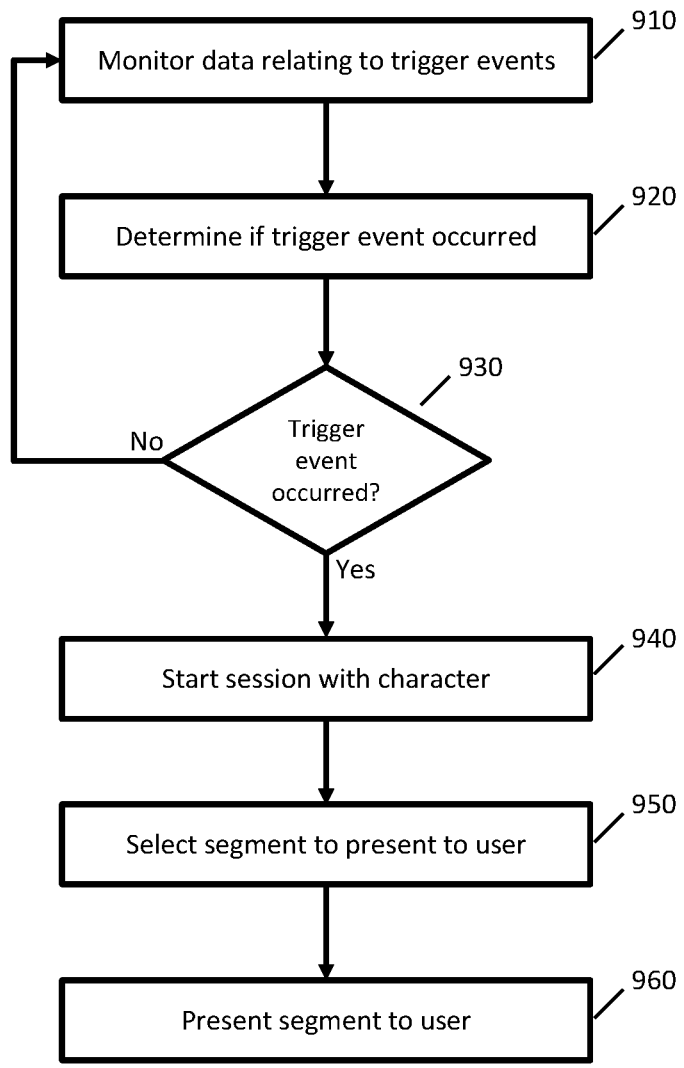
FIG. 9 is a flowchart illustrating an example implementation of starting a session between a Hero and a Sidekick in response to a trigger.

FIG. 9 is a flowchart illustrating an example implementation of starting a session between a user (e.g., a Hero) and a character (e.g., a Sidekick) in response to a trigger. In FIG. 9, the ordering of the steps is exemplary and other orders are possible, not all steps are required and, in some implementations, some steps may be omitted or other steps may be added. The process of the flowcharts may be implemented, for example, by any of the computers or systems described herein.

At step 910, data is monitored that may be used to determine if a trigger event has occurred. For example, audio data from a microphone of the user device, video data from a camera data of the user device, a location of the user device, biometric or other sensor data from other sensors of the user device, or a calendar of the user may be monitored. The monitoring may occur on any appropriate schedule, for example at regular intervals, such as every 5 minutes.

At step 920, it is determined if a trigger event has occurred. Any appropriate processing may be used to determine if a trigger event has occurred. For example, an emotional state of the user may be determined, the location of the user may be compared to locations corresponding to trigger events, words spoken by the user may be compared to words corresponding to trigger events, or events in a calendar of the user may be compared to the current date and time.

At step 930, if a trigger event has not occurred, then processing proceeds to step 910 where the monitoring for a trigger event may continue. If a trigger event has occurred, then processing may proceed to step 940.

At step 940, a session with the character is started. Before presenting a segment by the character, actions may be taken to get the attention of the user, such as playing audio from a speaker of the user device to inform the user that a session is starting. In some implementations, the session may start immediately or may start after the user takes an action, such as picking up the user's device or touching a start button on the user's device.

At step 950, a segment is selected to present to the user. The segment may be selected using any of the techniques described above. For example, the technique for selecting the segment may be particular to the event trigger that caused the session to start.

At step 960, the segment is presented to the user. The segment may be presented to the user using any of the techniques described above. After presenting the segment another segment may be selected and presented to the user until some stop condition has been met, such as the user ending the session.

Intervention in an Automated Session

During a session with an automated Sidekick, a Hero may become emotional or stressed or enter into a state where the Hero would benefit from assistance from a person guiding the Sidekick instead of or in addition to the automated Sidekick. The sensors of the Hero device may be able to determine the state of the Hero (e.g., by processing heart rate, facial expressions, or speech of the Hero). Based on the state of the Hero, it may be determined to request assistance from a Coach, and a Coach may be made available to guide the Sidekick using any of the techniques described herein. In some implementations, the automated Sidekick may be replaced by a Sidekick that is guided by a Coach or a Coach may monitor the session between the Hero and the automated Sidekick and intervene to control or influence actions of the Sidekick. In some implementations, a mode of operation of a Sidekick may change from an automated mode to a guided mode. The techniques described herein may be combined with or used in conjunction with any of the techniques described in U.S. patent application Ser. No. 15/166,507, titled "Requesting Assistance Based on User State," which is hereby incorporated by reference in its entirety for all purposes.

The state of the Hero may be determined using any of the techniques described above relating to trigger events. For example, the state of the Hero may be determined using data from any sensors of the Hero device, classifiers may be used to determine the state of the Hero, the state may have a severity level, and the data used to monitor of the Hero may proceed in various stages to protect the privacy of the Hero.

The state of the Hero may be used to determine whether a Hero would benefit from the assistance of a Coach. For example, a particular state or a particular state in combination with a severity level may indicate that a Hero needs assistance. The criteria for determining whether a Hero needs assistance may specific to each individual Hero, and may be set by the Hero or by another person, such as a parent or therapist of the Hero.

When it is determined that a Hero needs assistance, a Coach may be requested to guide the Sidekick to provide the needed assistance to the Hero. In some implementations, the request for assistance may be sent to particular people, such as the parents of the Hero or a medical professional treating the Hero. In some implementations, the request for assistance may instead or additionally be sent to a Coach-providing service that provides Coaches on demand. The Coach may be requested using any of the techniques described above, such as sending a text message to a parent or a Coach-providing service sending notifications to one or more selected Coaches.

After a request for a Coach has been sent, it make take some time for a Coach to be available to guide the Sidekick. For example, a parent may be driving and need to stop the car in a safe place and start a Coach application to begin guiding a Sidekick. While waiting for a Coach to be available, a segment may be selected and presented to the Hero to assist the Hero until the Coach is available. The selected segment may be general to all Heroes or may be adapted specifically to the personality or habits of a particular Hero. For example, the selected segment may attempt to calm the Hero or distract the Hero from a situation or event that is troubling the Hero. While a Coach is being requested, the selected segment may, for example, play calming music, play a favorite video clip of the Hero, repeat a previous lesson about how to handle stressful situations, present a game for the Hero to play, or allow the Hero to select or search for a video clip.

To help the Coach prepare for assisting the Hero, the Coach may be presented with information about the Hero, information about previous sessions with the Hero, and/or information about the current situation of the Hero. This information may be especially helpful where the Coach does not know the Hero (e.g., a Coach from a Coach-providing service). Information about the Hero, such as a Hero profile, may allow a Coach to quickly understand key details of how to interact with the Hero (e.g., the disability and/or skill levels of the Hero). Information about a previous session, such as a transcript, summary, or notes of the session, may help the Coach understand effective communication strategies for the Hero. Additionally, recently captured data from the Hero device may be presented to the Coach, such as the last 5 minutes of audio and/or video captured from the Hero device, the current location of the Hero device, or a plot of the last 5 minutes of the Hero's heart rate. The Coach may use this information to understand the Hero's current situation and provide appropriate assistance.

The process of determining that a Hero needs assistance, obtaining a Coach to assist, and having the Coach guide the Sidekick may be referred to as intervention. In some implementations, the transition from an automated Sidekick to a guided Sidekick may be seamless and transparent to the Hero (e.g., the Hero may not know that the Sidekick has changed from an automated Sidekick to a guided Sidekick). In some implementations, the Hero may be notified that the automated Sidekick has transitioned to a guided Sidekick, such as by changing the appearance of the Sidekick from gray to color.

After a Coach has joined a communications session with the Hero, the Coach may observe automated communications between the Hero and Sidekick or may take actions to control the Sidekick. In some implementations, the Coach may select one or more segments to be presented by the automated Sidekick, the Coach may select or formulate a response for the Sidekick to present to the Hero, or the Coach may take any other appropriate actions to control or influence the communications by the Sidekick to the Hero.

The participation of the Coach in the communications session may continue until any appropriate stopping point, such as the Coach determining that the Hero no longer needs assistance or an automatic determination that the Hero no longer needs assistance (e.g., using emotion detection techniques as described above). After the Coach stops guiding the Sidekick, the Sidekick may transition back to an automated mode of operation or the session between the Hero and the Sidekick may end.

The request for assistance by a Coach may be triggered by situations other than those described above. In some implementations, the request for assistance may be made by another person who is near the Hero and observes that the Hero needs assistance. For example, a teacher, friend, or family member of the Hero may observe that the Hero is stressed. This person may have access to an application that allows them to request the assistance of a Coach on behalf of the Hero, or the person may use other methods to contact someone who can help, such as calling a parent.

In some implementations, the intervention by a Coach may be triggered by the Hero being in an unexpected location. A schedule for the Hero may be specified or obtained from an electronic calendar of the Hero, such as that the Hero should be at school from 8 am to 3 pm on Monday through Friday or that the Hero has a dentist appointment at a particular day and time. When the Hero is not in the expected location, a Coach may be requested to determine why the Hero is not in the expected location and, if needed, to assist the Hero in getting to the expected location.

Figure 10:
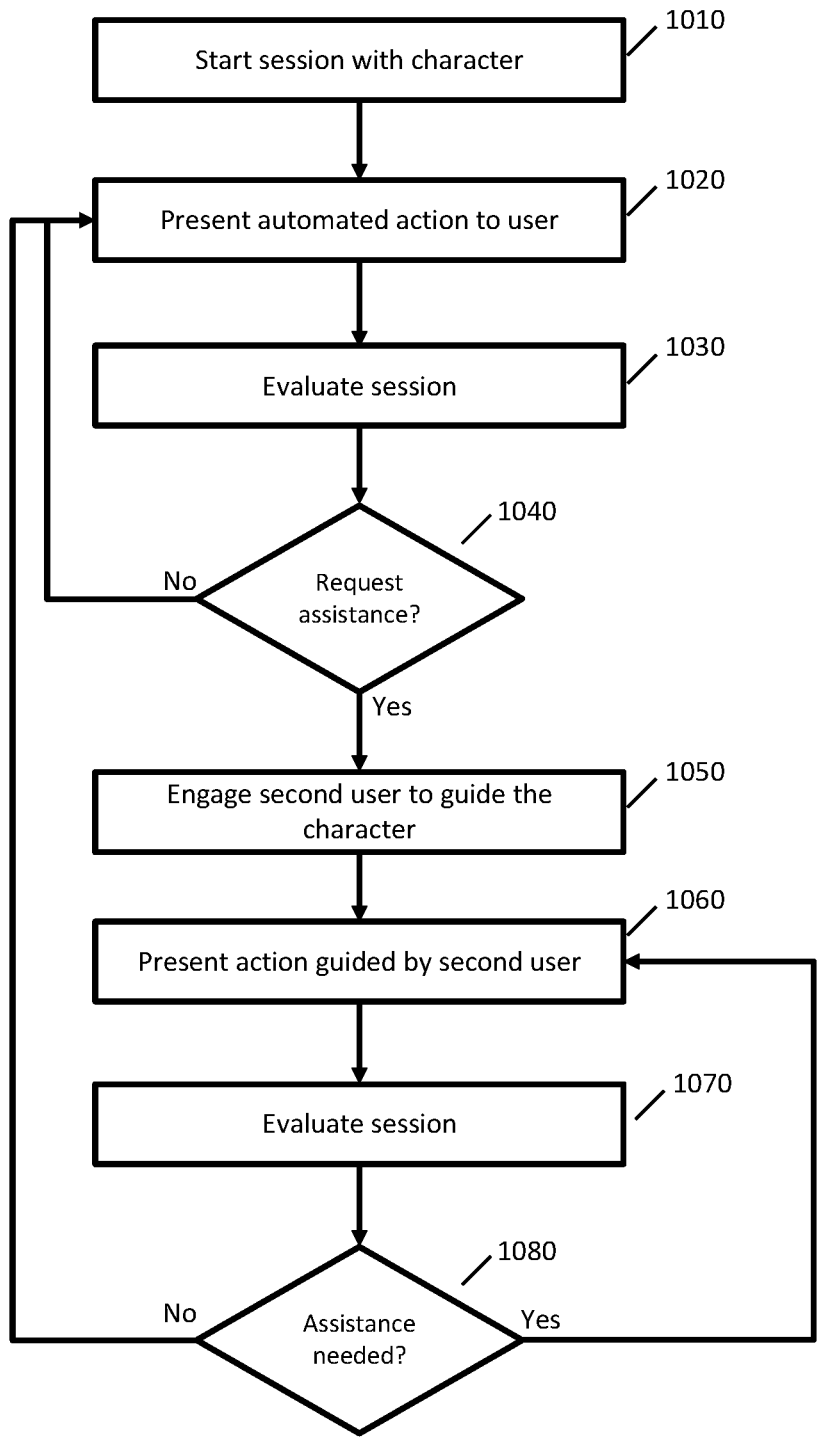
FIG. 10 is a flowchart illustrating an example implementation of requesting assistance during a session between a Hero and a Sidekick.

FIG. 10 is a flowchart illustrating an example implementation of requesting assistance during a session between a user (e.g., a Hero) and a character (e.g., a Sidekick). In FIG. 10, the ordering of the steps is exemplary and other orders are possible, not all steps are required and, in some implementations, some steps may be omitted or other steps may be added. The process of the flowcharts may be implemented, for example, by any of the computers or systems described herein.

At step 1010, a session between a user and a character is started, for example, using any of the techniques described above, such as the techniques described for step 310 of FIG. 3.

At step 1020, an automated interaction is presented to the user using any of the techniques described above. For example, a segment may be selected, and the character may present a communication to the user, such as by speaking a phrase using a text-to-speech voice.

At step 1030, the session between the user and the character is evaluated. In some implementations, the evaluation may be continuous and ongoing. For example, audio and video of the user may be continuously processed to determine the state of the user. In some implementations, the evaluation may occur on regular time intervals, such as every 5 minutes. In some implementations, the evaluation may occur after every interaction or certain types of interactions. For example, the evaluation may occur after each communication received from the user for the character.

Any appropriate techniques may be used to perform the evaluation. For example, sensor data of sensors of a device of the user may be processed to determine a state (e.g., an emotional state of the user). In some implementations, the content of communications of the user may be processed (e.g., using speech recognition and/or natural language processing) and the evaluation may be based on the communication of the user. In some implementations, the evaluation may be based on other aspects of the communications session. For example, an evaluation may be based on the amount of time between a communication presented by the character and a subsequent communication received from the user.

At step 1040, it is determined whether to request assistance from a person. For example, certain states of the user or states in combination with a severity level may indicate that assistance is needed. If assistance is not needed, then processing may continue to step 1020 where a subsequent automated interaction is presented to the user.

If assistance is needed, then processing may continue to step 1050, where a second user is engaged to guide the character. A second user may be selected and engaged using any of the techniques described herein or in the applications incorporated by reference. In some implementations, the selection of the second user may be dependent on the state of the user interacting with the automated character. For example, if the user is sad, the second user may be selected from a Coach providing service, but if the user is severely anxious, then the second user may be a medical professional.

At step 1060, an interaction is presented to the user with the guidance of the second user. For example, the second user may type a phrase for the character to speak or select a segment to be presented by the character.

At step 1070, the session may be evaluated using any of the techniques described herein. In some implementations, the session may also be evaluated by the second user. For example, the second user may give rating on a scale of 1 to 5 or a thumbs up or thumbs down.

At step 1080, it is determined whether the assistance of the second user is still needed. For example, if the user is no longer in the state that caused the second user to be requested, then the assistance of the second user may no longer be needed. In some implementations, steps 1070 and 1080 may occur together and need not be separate steps. For example, the second user may determine that assistance is no longer needed without providing an explicit evaluation of the session.

If assistance is no longer needed, then processing may proceed to step 1020 where the session may be continued between the user and the character in an automated mode of operation. In some implementations, the session may instead be ended when assistance is no longer needed. If assistance is still needed, then processing may continue to step 1060, where the character may present a subsequent interaction as guided by the second user.

Segment Creation

To provide a better experience for the Hero, it may be desired to have a large number of segments available to present to a Hero. Having a large number of segments may provide the Hero with greater variety and keep the Hero more interested in interacting with the automated Sidekick. To more easily provide a larger number of segments, techniques may be used to facilitate the creation of segments.

In some implementations, at least some segments may be created manually. For example, a person may create a script and create one or more data items that may be used with the script. A script and a data item may be combined as described above to present a segment to a Hero.

In some implementations, segments may be created from a transcript of a session between a Hero and a Sidekick where the Sidekick was guided by a Coach. For example, a Coach may select a transcript or a portion of a transcript corresponding to a successful session with the Hero. The transcript may then be used to create a script for a segment. For example, proper names (such as the name of the Hero, a movie, or a character in a movie) may be replaced with variables to be filled in with proper names from data items. Communications by the Hero may be replaced by a prompt for the Hero to provide information, such as to select one of multiple choices. Video clips presented to the Hero may be replaced by a variable to indicate a selection of a video clip.

In some implementations, transcripts of multiple sessions (either with a single Hero or with multiple Heroes) may be processed to identify transcripts or portions of transcripts that may be good candidates for creating segments. In some implementations, a transcript that was given a positive evaluation (either by a Hero, a Coach, or performed automatically) may be a good candidate for creating an automated segment. In some implementations, natural language processing techniques may be used to identify transcripts with similar subject matter (e.g., segments relating to going to bed) and these transcripts may be used to create a segment. For example, transcripts may be processed using latent Dirichlet allocation to identify topics in the transcripts, and the most frequently occurring topics may be used to create segments. The segments may be created manually as described above.

In addition to generating scripts, data items to be used with scripts may be created. In some implementations, the data items may be created manually. For example, a person may create data items similar to FIGS. 7A-7D by using their personal knowledge or by searching to find relevant data to create a data item. In some implementations, data items may be created using existing databases of information. For example, an existing database of jokes may be processed to create a data item for each joke that may be used with a joke script to present joke segments to a Hero.

In some implementations, data items for scripts may be created through automatic processing. For example, movies may be processed to identify movie scenes that can be used as a data item. To identify relevant movies scenes, a transcript of the movie may be processed to understand the content of the scene. For example, a movie scene may relate to certain subject matters, such as making friends, doing chores, or getting along with other people. In addition, audio and/or video of the scene may be processed to understand other aspects of the scene. Signal processing may be used to determine emotions of people in the scene from their voice. Similarly, image processing may be used to determine emotions of people in the scene from their facial expressions. The movie scenes may be tagged with information about the scene, such as the characters in the scene, the emotions of people in the scene, or the subject matter of the scene. The scene and the tags may then be processed to create a data item for the scene, such as the data item of FIG. 6C or FIG. 6F.

In some implementations, a segment may be created using a mathematical model. A mathematical model may be created that receives an input corresponding a state of the conversation (e.g., what happened previously in the conversation, such as previous communications by the Hero or the Sidekick), receives an input corresponding to a current communication of the Hero, and then determines a communication to respond to the Hero. For example, a mathematical model may be trained using a corpus of existing transcriptions and may take the form of a partially observable Markov decision process (POMDP).

A mathematical model may be trained for a segment by processing transcripts of conversations between a Hero and a Sidekick where the Sidekick was guided by a Coach. In some implementations, the transcripts used to train a model may be all transcripts for a particular Hero, all transcripts relating to a particular topic (e.g., going to be bed), or all transcripts relating to a topic that is automatically identified in transcripts by using a generative model, such as latent Dirichlet allocation. The selected transcripts may then be used to train the mathematical model.

In some implementations, a set of desired topics may be identified, such as topics relating to getting out of bed in the morning, going to school, doing chores, and going to bed. Transcripts may be identified that relate to each of these topics. For example, transcripts may be manually tagged as relating to a topic, or transcripts may be processed using natural language processing techniques to determine if a transcript relates to a particular topic. After transcripts have been identified for each topic, a mathematical model may be trained for each topic using the transcripts for each topic, and a segment may be created using the mathematical model.

For example, to create a segment relating to going to bed, transcripts may be identified that relate to going to bed. Transcripts may be identified using any appropriate techniques. Keyword spotting may be used to identify relevant transcripts, such as transcripts that include the word "bed." Transcripts may also be identified using other natural language processing to distinguish transcripts that relate to making your bed in the morning from getting ready to go to bed in the evening. Transcripts may also be selected using metadata. For example, a transcript from 9 pm is more likely to be about going to bed than a transcript from 9 am. The identified transcripts that relate to going to bed may be used to train a mathematical model (e.g., a POMDP model). The mathematical model may then be used to create a segment that relates to going to bed. The "going to bed" segment may generate communications from the Sidekick to the Hero, such as responding to a Hero's statements about going to bed.

In some implementations, transcripts of an automated session may be reviewed by a person afterwards, such as a parent or a therapist. The transcript of the automated session may be reviewed and corrected to improve the performance of the automated Sidekick. For example, a response of a Sidekick may be changed to be a more suitable response to a communication of the Hero. In some implementations, the transcript or portions of the transcript of the automated session may be evaluated by a person. For example, each communication of the automated Sidekick may be given a thumbs up or a thumbs down or ranked on a scale of 1 to 5. After the transcripts have been reviewed, modified, and or evaluated by a person, the transcripts may be used to further improve the performance of the automated Sidekick. For example, a mathematical model for the automated Sidekick may be retrained using the modified and/or evaluated transcript. Portions of the transcript that are rated highly may be more likely to be repeated in the future and portions of the transcript that are rated lower may be less likely to be repeated in the future.

Controlling Operation of an Automated Sidekick

As described above, it may be desired for the operation of the Sidekick to be customized or adapted to a Hero. Accordingly, a Sidekick in an automated mode of operation may behave differently with different Heroes. For example, the automated Sidekick may present different types of segments or may present the same types of segments in different ways (e.g., with a different skill level or combined with different content, such as a movie clip from a different movie).

A person may configure the operation of an automated Sidekick for a particular Hero. For example, a parent of the Hero, a medical professional treating the Hero, or a Coach may configure aspects of the operation of the automated Sidekick. For clarity, the person configuring the automated Sidekick for a Hero will be referred to as a Coach with the understanding that any person may perform this role.

A Sidekicks service may provide a user interface to allow a Coach to configure an automated Sidekick for a Hero. For example, a Sidekicks service may provide a web page or provide an app that may be installed on a user device for configuring the automated Sidekick. Any appropriate techniques for providing configuration information may be used for configuring an automated Sidekick.

Configuring an automated Sidekick may include providing information about the Hero, such as any information that may be included in a Hero profile, as described above. The information about the Hero may be used for selecting segments to be presented by the automated Sidekick. The following are non-limiting examples of how information about a Hero may be used to select segments: the goals of the Hero may be used to select segments corresponding to lessons (e.g., the Hero is working on identifying a particular emotion), the affinities of the Hero may be used to select video clips to be used with a segment, or a skill level of the Hero may be used to select an appropriate segment.

Configuring an automated Sidekick may include providing preferences, likes, or dislikes of the Hero. Preferences or likes may include anything that the Hero likes, such as movies, music, TV shows, animals, or colors. Preferences or likes may include affinities as described herein, but are not limited to affinities. Dislikes of the Hero may include anything that the Hero dislikes, which may include fears or aversions of the Hero. For example, the Hero may not like particular movies, particular characters in movies, or may be afraid of dogs. The preferences, likes, and dislikes of the Hero may be used in presenting segments to the Hero. For example, segments relating to preferences or likes may be presented more frequently and segments relating to dislikes may never be presented.

Configuring an automated Sidekick may include providing information about selecting segments to present to the Hero. Any appropriate information may be provided to select segments to be presented to the Hero. The following are non-limiting examples of information that may be provided to control segment selection: maximum of two games per session; minimum of one lesson per session; minimum or maximum time limits for a session; specifying parameters for selecting types of segments (e.g., select a joke 10% of the time); specifying parameters of a segment (e.g., 30% of lessons should be about identifying anger); or specifying a mathematical model for segment selection (e.g., selecting a mathematical model trained using previous sessions with the Hero).

Configuring an automated Sidekick may include providing a script to be used in presenting segments, such as any of the scripts described above. The Coach may select from a library of scripts, adapt an existing script, or create a new script. Any appropriate techniques may be used for selecting, adapting, or creating scripts. For example, a user interface may be provided that allows a Coach to create a script by dragging and dropping user interface elements into a particular order. For another example, a script language, such as a simple programming language, may be provided to allow a Coach to author scripts. The authored script may be in any appropriate format, such as text or a comma separated value file.

In some implementations, a Coach may create a script using a transcript of a previous session with the Hero where the Sidekick was guided by this Coach or another Coach. For example, a transcript may be identified that the Hero really liked, that helped the Hero learn, or helped the Hero in completing a task. A user interface may be provided to assist the Coach in converting the existing transcript into a script, such as by replacing video clips with an indication to select and play a particular video clip or a randomly selected video clip. In some implementations, a Coach may select a portion of a transcript, and the selected portion may become a segment that may be presented by an automated Sidekick. For example, a selected portion of a transcript may include a sequence of interactions presented by a Sidekick. In some implementations, a Coach may be able to edit a transcript before using it to create a segment or a script.

The Coach may provide the script to the Sidekicks service in configuring the automated Sidekick for the Hero, and the script may be used in presenting segments to the Hero. During the segment selection process, the Coach-provided script may be selected, may be combined with other data (e.g., a movie clip), and used to present a segment to the Hero.

The configuration information provided by the Coach may be used to control the operation of the automated Sidekick when the automated Sidekick interacts with the Hero. Because different configuration information may be provided for different Heroes, the segment selection process may be customized for each Hero so that it is adapted to the particular needs of the Hero.

An automated Sidekick may be implemented as a standalone application (e.g., a smartphone app) that operates on a Hero device and does not need a network connection to operate. In this implementation, the configuration information for the Sidekick may be stored on the Hero device. During an installation or configuration process of the application, the configuration information may be transferred from a Sidekicks server to the Hero device. An automated Sidekick may also be implemented as part of a service where a network connection is required, and the configuration is stored on a Sidekicks server. Interactions to be presented by the automated Sidekick may be transmitted from the Sidekicks server to the Hero device, and then presented by the Hero device. An automated Sidekick may also be implemented as any appropriate combination of a standalone application and a service provided via a network.

During a session between a Hero and an automated Sidekick, segments may be presented to the Hero using any of the techniques described above. The configuration information may be used to control the operation of the automated Sidekick by using the configuration information to select segments, select parameters of segments, or control any other aspect of the session. Although the configuration information is used to control the operation of the automated Sidekick, the control is not absolute in that control does not require that a list of segments be completely specified in advance. In some implementations, the configuration information may be used to control the automated Sidekick by constraining aspects of the segment selection process, such as by specifying probabilities in a random selection of a segment, specifying probabilities in a random selection of parameters of a segment, or by limiting the types segments or parameters of segments that may be selected.

Figure 11:
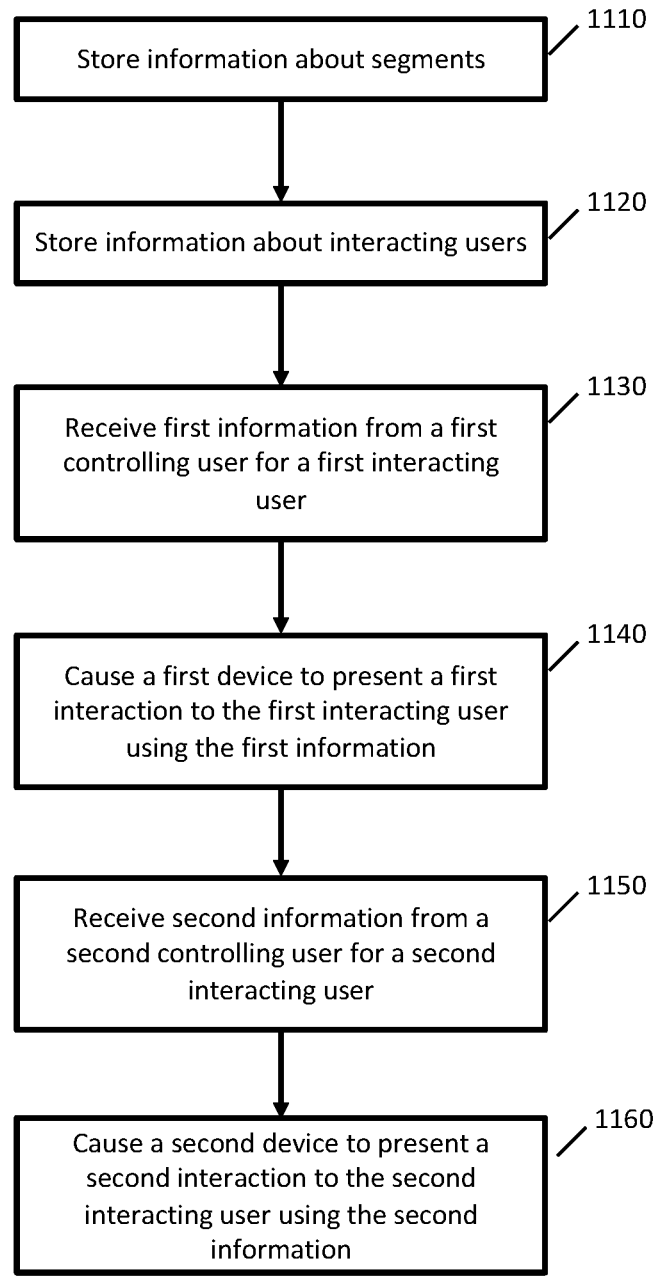
FIG. 11 is a flowchart illustrating an example implementation of controlling the operation of a Sidekick for interacting with a Hero.

FIG. 11 is a flowchart illustrating an example implementation of controlling the operation of a character (e.g., a Sidekick) for interacting with an interacting user (e.g., a Hero). In FIG. 11, the ordering of the steps is exemplary and other orders are possible, not all steps are required and, in some implementations, some steps may be omitted or other steps may be added. The process of the flowcharts may be implemented, for example, by any of the computers or systems described herein.

At step 1110, information about segments is stored. The information about the segments may be stored in any appropriate ways, such as in scripts data store 230 and segment data store 250. The information about the segments may include any of the information described herein, such as a script and segment data, but are not limited to scripts and segment data.

At step 1120, information about interacting users is stored. An interacting user may be any user who interacts with an automated character on a device. For example, an interacting user may be a child with special needs, such as a child with autism. The information about the interacting users may be stored using any appropriate techniques. For example, the interacting user may register with a company who provides the character or another person may register the interacting user with the company. The information about the interacting user may include any information about Heroes described herein.

At step 1130, first information is received from a first controlling user for controlling the operation of a character when the character is interacting with the first interacting user on a first device. The first information may include any of the information described above, such as configuration information, information about the first interacting user, or information about selecting segments for the first interacting user.

At step 1140, a first device is caused to present a first interaction by the character to the first interacting user. For example, the character may speak a phrase to the first interacting user using text-to-speech technology and/or text may be presented on a display as if coming from the character. In some implementations, the first interaction may be determined from a first segment where the first segment was selected using the first information. In some implementations, the first device is caused to present the first interaction by causing an application to be configured using the first information, and in some implementations, the first device is caused to present the first interaction by transmitting text and/or audio to the first device to be presented by the character.

At step 1150, the same operations of step 1130 are performed except that they are being performed by a second controlling user for a second interacting user and for controlling a second character presented by a second device. Accordingly, the second information may be different from the first information and the control of the character may be different for the second interacting user than for the first interacting user.

At step 1160, a second device is caused to present a second interaction by the character to the second interacting user, and this step may be performed in a similar manner as step 1140. The appearance and/or sound of the second character that is presented to the second interacting user may be the same as or different from the appearance and/or sound of the first character that is presented to the first interacting user. The character presented to the second interacting user is referred to as a second character as opposed to the first character presented to the first interacting user even though the first and second characters may have the same appearance and/or sound.

In some implementations, a character may be presented by a device as described in the following clauses, combinations of any two or more of them, or in combination with other clauses presented herein.

1. A system for interacting with a user of a device through a character presented by the device, the system comprising one or more computers configured to:
   obtain information about a trigger event;
   determine that the trigger event has occurred by processing the information about the trigger event;
   cause, in response to determining that the trigger event has occurred, a session with the character to be started on the device;
   select a first segment to present to the user, wherein the first segment comprises a sequence of interactions between the user and the character;
   determine a first interaction using the first segment; and
   cause the character to present the first interaction.

2. The system of clause 1, wherein the one or more computers are configured to select the first segment using the information about the trigger event.

3. The system of clause 1, wherein the trigger event is associated with a plurality of segments and the one or more computers are configured to select the first segment by selecting the first segment from the plurality of segments.

4. The system of clause 1, wherein the one or more computers are configured to determine that the trigger event has occurred by:
   determining an emotional state of the user using sensors of the device;
   processing a location of the device;
   processing data from a motion sensor of the device;
   processing an image from a camera of the device;
   determining a word spoken by the user or another user;
   determining a meaning of words spoken by the user or another user; or
   comparing information about an item from a calendar of the user of the device to a current date or time.

5. The system of clause 1, wherein the first segment comprises a first script and a first data item.

6. The system of clause 1, wherein the one or more computers are configured to cause the character to present the first interaction by at least one of (i) causing the device to present audio using a text-to-speech voice, or (ii) causing a phrase to be presented on a display of the device.

7. The system of clause 1, wherein the one or more computers are configured to select the first segment using information about the user.

8. A method for interacting with a user of a device through a character presented by the device, the method comprising:
   obtaining information about a trigger event;
   determining that the trigger event has occurred by processing the information about the trigger event;
   causing, in response to determining that the trigger event has occurred, a session with the character to be started on the device;
   selecting a first segment to present to the user, wherein the segment comprises a sequence of interactions between the user and the character;
   determining a first interaction using the first segment; and
   causing the character to present the first interaction.

9. The method of clause 8, comprising:
   receiving input from the user;
   determining a second interaction using the first segment and the input; and
   causing the character to present the second interaction.

10. The method of clause 9, wherein receiving input from the user comprises receiving text typed by the user, an indication of a selection of a user interface element by the user, or an audio signal comprising speech of the user.

11. The method of clause 8, comprising:
    selecting a second segment to present to the user;
    generating a second interaction using the second segment; and
    causing the character to present the second interaction.

12. The method of clause 8, wherein selecting the first segment comprises using a mathematical model or rules corresponding to the user.

13. The method of clause 12, wherein the mathematical model was created by processing transcripts of sessions between the user and the character when the character was being guided by a second user.

14. The method of clause 8, comprising:
    determining to request assistance from a second user by processing data corresponding to the session;
    receiving a third interaction specified by the second user; and
    causing the character to present the third interaction.

15. The method of clause 14, wherein the second user is selected from a plurality of users.

16. The method of clause 14, wherein receiving the third interaction comprises receiving a phrase to be presented by the character that was selected by the second user.

17. One or more non-transitory computer-readable media comprising computer executable instructions that, when executed, cause at least one processor to perform actions comprising:
    obtaining information about a trigger event;
    determining that the trigger event has occurred by processing the information about the trigger event;
    causing, in response to determining that the trigger event has occurred, a session with the character to be started on the device;
    selecting a first segment to present to the user, wherein the segment comprises a sequence of interactions between the user and the character;
    determining a first interaction using the first segment; and
    causing the character to present the first interaction.

18. The one or more non-transitory computer-readable media of clause 17, wherein the first segment comprises a first script and a first data item.

19. The one or more non-transitory computer-readable media of clause 17, wherein the first data item comprises information about the user, information about a video clip, or a phrase to be presented by the character.

20. The one or more non-transitory computer-readable media of clause 17, wherein selecting the first segment comprises:
    randomly selecting the first script from a plurality of scripts; and
    randomly selecting the first data item from a plurality of data items.

In some implementations, a character may be presented by a device as described in the following clauses, combinations of any two or more of them, or in combination with other clauses presented herein.

1. A system for controlling the operation of a character presented by a device, the system comprising one or more computers configured to:
    store information about:
        segments comprising a first segment and a second segment, wherein each segment describes interactions between an interacting user and a character, and
        interacting users comprising a first interacting user and a second interacting user;
    receive, from a first controlling user, first information for controlling the operation of a first character when the first character is interacting with the first interacting user, wherein the first information includes information about the first interacting user or information about one or more segments to be presented to the first interacting user;
    cause a first device to present a first interaction by the first character to the first interacting user, wherein the first interaction was obtained from the first segment and wherein the first segment was selected using the first information;
    receive, from a second controlling user, second information for controlling the operation of a second character when the second character is interacting with the second interacting user, wherein the second information includes information about the second interacting user or information about one or more segments to be presented to the second interacting user; and
    cause a second device to present a second interaction by the second character to the second interacting user, wherein the second interaction was obtained from the second segment and wherein the second segment was selected using the second information.

2. The system of clause 1, wherein the one or more computers are configured to cause the first device to present the first interaction by (i) transmitting configuration information to configure software on the first device, or (ii) transmitting audio or text of the first interaction to the first device.

3. The system of clause 1, wherein the first controlling user comprises a parent of the first interacting user.

4. The system of clause 1, wherein the information about the first interacting user comprises (i) preferences of the first interacting user or (ii) a skill level of the first interacting user.

5. The system of clause 1, wherein the information about segments to be presented to the first interacting user comprises (i) a script, (ii) a parameter indicating a type of segment, or (iii) a parameter of a segment.

6. The system of clause 1, wherein the first segment comprises a first script and a first data item.

7. The system of clause 1, wherein the one or more computers are configured to cause the first device to present the first interaction by the first character by at least one of (i) causing the device to present audio using a text-to-speech voice, or (ii) causing a phrase to be presented on a display of the device.

8. A method for controlling the operation of a character presented by a device, the method comprising:
    storing information about:
        segments comprising a first segment and a second segment, wherein each segment describes a plurality of interactions between an interacting user and a character, and
        interacting users comprising a first interacting user and a second interacting user;
    receiving, from a first controlling user, first information for controlling the operation of a first character when the first character is interacting with the first interacting user, wherein the first information includes information about the first interacting user or information about one or more segments to be presented to the first interacting user;
    causing a first device to present a first interaction by the first character to the first interacting user, wherein the first interaction was obtained from the first segment and wherein the first segment was selected using the first information;
    receiving, from a second controlling user, second information for controlling the operation of a second character when the second character is interacting with the second interacting user, wherein the second information includes information about the second interacting user or information about one or more segments to be presented to the second interacting user; and causing a second device to present a second interaction by the second character to the second interacting user, wherein the second interaction was obtained from the second segment and wherein the second segment was selected using the second information.

9. The method of clause 8, comprising:
receiving input from the first interacting user;
determining a third interaction using the first segment and the input; and
causing the first character to present the third interaction.

10. The method of clause 8, comprising:
training a first mathematical model for the first character using transcripts of previous sessions with the first interacting user, and wherein causing the first device to present the first interaction comprises generating the first interaction using the first mathematical model; and
training a second mathematical model for the second character using transcripts of previous sessions with the second interacting user, and wherein causing the second device to present the second interaction comprises generating the second interaction using the second mathematical model.

11. The method of clause 8, comprising:
selecting a second segment to present to the first interacting user using the first information;
generating a third interaction using the second segment; and
causing the first character to present the third interaction.

12. The method of clause 8, wherein selecting the first segment comprises using a mathematical model or rules corresponding to the first interacting user.

13. The method of clause 12, wherein the first information comprises an indication of the mathematical model or rules.

14. The method of clause 8, comprising:
determining to request assistance from an intervening user by processing data received from the first device;
receiving a third interaction specified by the intervening user; and
causing the first character to present the third interaction.

15. The method of clause 14, wherein the intervening user is selected from a plurality of users.

16. The method of clause 14, wherein the information about segments to be presented to the first interacting user comprises a goal for the first interacting user.

17. One or more non-transitory computer-readable media comprising computer executable instructions that, when executed, cause at least one processor to perform actions comprising:
receiving, from a first controlling user, first information for controlling the operation of a first character when the first character is interacting with a first interacting user, wherein the first information includes information about the first interacting user or information about one or more segments to be presented to the first interacting user;
causing a first device to present a first interaction by the first character to the first interacting user, wherein the first interaction was obtained from a first segment and wherein the first segment was selected using the first information;
receiving, from a second controlling user, second information for controlling the operation of a second character when the second character is interacting with a second interacting user, wherein the second information includes information about the second interacting user or information about one or more segments to be presented to the second interacting user; and
causing a second device to present a second interaction by the second character to the second interacting user, wherein the second interaction was obtained from a second segment and wherein the second segment was selected using the second information.

18. The one or more non-transitory computer-readable media of clause 17, wherein the first segment comprises a first script and a first data item.

19. The one or more non-transitory computer-readable media of clause 17, wherein the first data item comprises information about the user, information about a video clip, or a phrase to be presented by the first character.

20. The one or more non-transitory computer-readable media of clause 17, wherein selecting the first segment comprises:
randomly selecting the first script from a plurality of scripts; and
randomly selecting the first data item from a plurality of data items.

Implementation

Figure 12:
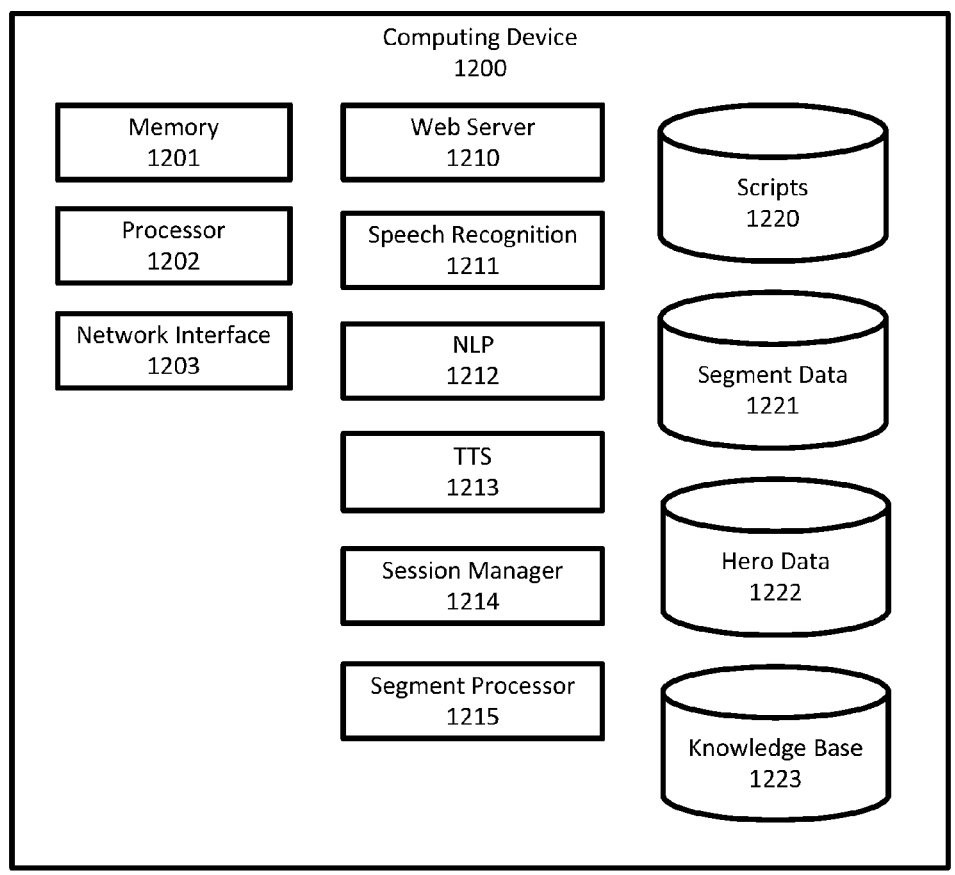
FIG. 12 illustrates components of a computing device that may be used to present a Sidekick to a Hero.

FIG. 12 illustrates components of some implementations of a computing device 1200 that may be used for any of a Hero device, a Coach device, a user device, or a server that operates in conjunction with any of the foregoing devices. In FIG. 12 the components are shown as being on a single computing device, but the components may be distributed among multiple computing devices, such as among any of the devices mentioned above or among several server computing devices.

Computing device 1200 may include any components typical of a computing device, such as one or more processors 1202, volatile or nonvolatile memory 1201, and one or more network interfaces 1203. Computing device 1200 may also include any input and output components, such as displays, keyboards, and touch screens. Computing device 1200 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1200 may include a web server component 1210 for interacting with other devices, such as Hero device or Coach device. Web server component 1210 may provide a user interface and other functionality to allow the Hero and/or Coach to interact with the Sidekicks service. Computing device 1200 may include a speech recognition component 1211 that may be used to recognize speech of a Hero, a Coach, or other people. The speech recognition results may be used, for example, to generate transcripts of a session or to facilitate a Coach in guiding a Sidekick. Computing device 1200 may include a natural language processing (NLP) component 1212, that may be used to process text and generate NLP results indicating a meaning of the processed speech. NLP results may be used, for example, to process transcripts to identify a topic of a transcript. Computing device 1200 may include a TTS component 1213 that may be used to generate audio from provided text (or other input), for example, to provide audio to be spoken by a Sidekick. Computing device 1200 may include a session manager 1214 that may be used to manage a session between a Hero and a Sidekick, such as by selecting a segment to present to a Hero. Computing device

1200 may include a segment processor component 1215 that may be used to present a segment to a Hero, such as by generating an interaction using a script and a data item.

Computing device 1200 may include or have access to various data stores, such as data stores 1220, 1221, 1222, and 1223. Data stores may use any known storage technology such as files or relational or non-relational databases. For example, computing device 1200 may have a scripts data store 1220 to store scripts that may be used to generate a segment. Computing device 1200 may have a segment data store 1221 to store a data item that may be used with a script to generate a segment. Computing device 1200 may have a Hero data store 1222 that may be used to store information about a Hero, such as a Hero profile containing information about the Hero. Computing device 1200 may have a knowledge base data store 1223 that may store other data to be used in presenting segments to a Hero, such as any of the data described herein.

The system and techniques described above therefore comprise technological improvements to several underlying technologies, including (among others): the technology of back-and-forth communication between two devices through a communication network to enable a user of one of the devices to manage operation of an application on the other of the devices; the technology of providing features in a user interface that are presented to a user of a device, based on information specified by a user of a second device; the technology of providing features in a user interface that help a user of a device to coach a user of another device by means of information and commands sent from the first device to the second device. The technological improvements include (among others) enhancing a user interface at one or both of the devices to provide additional and modified features based on information and commands sent through a communication network between the first device and the second device; providing information through a communication network to a user of one of the devices that help the user in controlling the application running on the other device; providing features of the user interface on the other of the devices that enhance the familiarity, comfort, and fluidity of the interaction by a user of the other device; and providing for selected, timed and choreographed communication back and forth between the two devices that facilitates real-time or near real-time virtual interaction between users of the two devices.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A system for interacting with a user of a device through a character presented by the device, the system comprising one or more computers configured to:
   determine that a trigger event has occurred by processing (i) information about the trigger event and (ii) data received from the device of the user or data received from a calendar of the user;
   cause, in response to determining that the trigger event has occurred, a session with the character to be started on the device;
   select a first script for interactions between the user and the character presented by the device;
   select a first movie clip data item from a data store of movie clip data items, wherein the first movie clip data item corresponds to a first movie clip and comprises an identifier of a character in the first movie clip;
   obtain information about the character in the first movie clip using the identifier;
   cause the device to present the first movie clip to the user;
   construct a phrase using the script and the information about the character in the first movie clip; and
   cause the character presented by device to present the phrase to the user.

2. The system of claim 1, wherein the one or more computers are configured to select the first movie clip data item using the information about the trigger event.

3. The system of claim 1, wherein the trigger event is associated with a plurality of scripts and the one or more computers are configured to select the first script by selecting the first script from the plurality of scripts.

4. The system of claim 1, wherein the one or more computers are configured to determine that the trigger event has occurred by:
   determining an emotional state of the user using sensors of the device;
   processing a location of the device;
   processing data from a motion sensor of the device;
   processing an image from a camera of the device;
   determining a word spoken by the user or another user;

determining a meaning of words spoken by the user or another user; or comparing information about an item from a calendar of the user of the device to a current date or time.

5. The system of claim 1, wherein the first movie clip data item comprises a start time and an end time of the first movie clip.

6. The system of claim 1, wherein the one or more computers are configured to cause the character presented by the device to present the phrase by at least one of (i) causing the device to present audio using a text-to-speech voice, or (ii) causing the phrase to be presented on a display of the device.

7. The system of claim 1, wherein the one or more computers are configured to select the first script using information about the user.

8. A method for interacting with a user of a device through a character presented by the device, the method comprising:

determining that a trigger event has occurred by processing (i) information about the trigger event and (ii) data received from the device of the user or data received from a calendar of the user;

causing, in response to determining that the trigger event has occurred, a session with the character to be started on the device;

selecting a first script for interactions between the user and the character presented by the device;

selecting a first movie clip data item from a data store of movie clip data items, wherein the first movie clip data item corresponds to a first movie clip and comprises an identifier of a character in the first movie clip;

obtaining information about the character in the first movie clip using the identifier;

causing the device to present the first move clip to the user;

constructing a phrase using the script and the information about the character in the first movie clip; and causing the character presented by device to present the phrase to the user.

9. The method of claim 8, comprising:

receiving input from the user;

constructing a second phrase using the first script and the input; and causing the character presented by the device to present the second phrase.

10. The method of claim 9, wherein receiving input from the user comprises receiving text typed by the user, an indication of a selection of a user interface element by the user, or an audio signal comprising speech of the user.

11. The method of claim 8, comprising:

selecting a second script;

generating a second phrase using the second script; and causing the character presented by the device to present the second phrase.

12. The method of claim 8, wherein selecting the first script comprises using a mathematical model or rules corresponding to the user.

13. The method of claim 12, wherein the mathematical model was created by processing transcripts of sessions between the user and the character presented by the device when the character presented by the device was being guided by a second user.

14. The method of claim 8, comprising:

determining to request assistance from a second user by processing data corresponding to the session;

receiving a second phrase specified by the second user; and causing the character presented by the device to present the second phrase.

15. The method of claim 14, wherein the second user is selected from a plurality of users.

16. The method of claim 8, wherein the first movie clip data item comprises a start time and an end time of the first movie clip.

17. One or more non-transitory computer-readable media comprising computer executable instructions that, when executed, cause at least one processor to perform actions comprising:

determining that a trigger event has occurred by processing (i) information about the trigger event and (ii) data received from the device of the user or data received from a calendar of the user;

causing, in response to determining that the trigger event has occurred, a session with the character to be started on the device;

selecting a first script for interactions between the user and the character presented by the device;

selecting a first movie clip data item from a data store of movie clip data items, wherein the first movie clip data item corresponds to a first movie clip and comprises an identifier of a character in the first movie clip;

obtaining information about the character in the first movie clip using the identifier;

causing the device to present the first move clip to the user;

constructing a phrase using the script and the information about the character in the first movie clip; and causing the character presented by device to present the phrase to the user.

18. The one or more non-transitory computer-readable media of claim 17, wherein the first movie clip data item comprises a start time and an end time of the first movie clip.

19. The one or more non-transitory computer-readable media of claim 17, wherein constructing the phrase comprises using information obtained from a profile of the user.

20. The one or more non-transitory computer-readable media of claim 17, wherein selecting the first movie clip data item comprises randomly selecting the first movie clip data item from the data store of movie clip data items.

* * * * *